US012773922B2

(12) United States Patent
Gertler et al.

(10) Patent No.: US 12,773,922 B2
(45) Date of Patent: Oct. 27, 2026

(54) GRID-CONNECTED ELECTRIC VEHICLE CHARGING STATION SYSTEM AND METHOD

(71) Applicant: AES Clean Energy Services, LLC, Salt Lake City, UT (US)

(72) Inventors: Noah Gertler, Boulder, CO (US); Christopher Boyer, Grand Prairie, TX (US); Alston D Costa, Lakewood, CO (US); Michael Simpson, Centennial, CO (US); Kelsey Horowitz, Louisville, CO (US)

(73) Assignee: AES Clean Energy Services, LLC, Salt Lake City, UT (US)

(*) Notice: Subject to any disclaimer, the term of this patent is extended or adjusted under 35 U.S.C. 154(b) by 0 days.

(21) Appl. No.: 19/028,058

(22) Filed: Jan. 17, 2025

(65) Prior Publication Data

US 2025/0229666 A1 Jul. 17, 2025

Related U.S. Application Data

(60) Provisional application No. 63/621,815, filed on Jan. 17, 2024.

(51) Int. Cl.
*B60L 53/52* (2019.01)
*B60L 53/51* (2019.01)
(Continued)

(52) U.S. Cl.
CPC ............... *B60L 53/67* (2019.02); *B60L 53/51* (2019.02); *H02J 3/32* (2013.01); *H02J 3/38* (2013.01);
(Continued)

(58) Field of Classification Search
CPC .............. H02J 3/38; H02J 13/00; H02S 10/02
See application file for complete search history.

(56) References Cited

U.S. PATENT DOCUMENTS

| | | | | |
|---|---|---|---|---|
| 9,937,810 | B2 | 4/2018 | Saussele et al. | |
| 10,399,450 | B2 * | 9/2019 | Miftakhov ............ | B60L 53/665 |

(Continued)

OTHER PUBLICATIONS

International Search Report for International Application No. PCT/US2025/011964 mailed on Jun. 20, 2025.

(Continued)

*Primary Examiner* — Ryan Johnson
*Assistant Examiner* — Esayas G Yeshaw
(74) *Attorney, Agent, or Firm* — Lempia Summerfield Katz LLC

(57) ABSTRACT

A grid-connected electric vehicle charging station system and method. Installing electric vehicle charging stations are typically high in cost, particularly due to requiring the utility grid to be upgraded to increase the electrical power routed to a respective customer site. In contrast, the system and method disclosed are low-footprint behind-the-meter solution that does not require any upgrade to the utility grid and that use the existing power capacity at a customer site. More particularly, the system and method rely on renewable energy sources, such as photovoltaics and batteries, as the primary source of energy to power the electric vehicles and rely on the utility grid connection for backup (limited to the existing electrical power routed to the respective customer site). In this way, the grid-connected electric vehicle charging station system and method may enable powering of electric vehicles while still allowing for easy installations at a customer site.

21 Claims, 16 Drawing Sheets

(51) Int. Cl.

| | |
|---|---|
| ***B60L 53/67*** | (2019.01) |
| ***H02J 3/32*** | (2006.01) |
| ***H02J 3/38*** | (2006.01) |
| ***H02S 10/20*** | (2014.01) |
| *H02J 13/12* | (2026.01) |
| *H02J 101/24* | (2026.01) |

(52) U.S. Cl.

CPC ........... *H02S 10/20* (2014.12); *B60L 2210/10* (2013.01); *B60L 2210/30* (2013.01); *H02J 13/12* (2026.01); *H02J 2101/24* (2026.01)

(56) References Cited

U.S. PATENT DOCUMENTS

| | | | | |
|---|---|---|---|---|
| 10,587,116 | B2 | 3/2020 | Long et al. | |
| 12,083,919 | B2 * | 9/2024 | Kim | B60L 53/305 |
| 2021/0362614 | A1 | 11/2021 | Carr | |
| 2022/0111751 | A1 | 4/2022 | Kim et al. | |
| 2022/0200276 | A1 | 6/2022 | Ley et al. | |
| 2023/0145630 | A1 | 5/2023 | Chow et al. | |
| 2023/0182615 | A1 * | 6/2023 | Pizzurro | B60L 53/18 320/109 |
| 2023/0356607 | A1 | 11/2023 | Mcalwee et al. | |

OTHER PUBLICATIONS

Written Opinion for International Application No. PCT/US2025/011964 mailed on Jun. 20, 2025.

How It Works: Electric Transmission & Distribution and Protective Measures, Learning Series: Energy Security & Resilience, pp. 1-6, Nov. 2023, U.S. Department of Energy (Office of Cybersecurity, Energy Security, and Emergency Response).

* cited by examiner

GRID-CONNECTED ELECTRIC VEHICLE CHARGING STATION SYSTEM AND METHOD

REFERENCE TO RELATED APPLICATION

This application claims priority to U.S. Provisional Application Ser. No. 63/621,815 filed Jan. 17, 2024, the entire disclosure of which is hereby incorporated by reference herein.

FIELD OF THE INVENTION

The present application relates generally to a grid-connected electric vehicle charging station system and method. Specifically, the disclosure relates to the electric vehicle charging station system that includes DC power generation (e.g., solar panels) and DC power storage (e.g., batteries), thereby supplying the majority of the power to charge the electric vehicles so that the electric vehicle charging station system need only connect to the grid via a standard connection (e.g., a behind-the-meter connection).

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

The use of electric vehicles is increasing. However, in order for electric vehicles to become more prevalent, electric vehicle charging stations need to become more easily accessible and more ubiquitous. For example, certain sections of the United States face a dearth of electric vehicle charging stations, oftentimes due to the expense of installing the electric vehicle charging stations.

SUMMARY

In one or some embodiments, a grid-connected electric vehicle charging station system is disclosed. The may be installed at least partly (or entirely) at a customer site that is configured for electrical connection to a utility grid. The grid-connected electric vehicle charging station system may include: at least one DC bus; AC-DC converter electronics configured for electrical connection to a meter at the customer site and for electrical connection to the DC bus; a plurality of solar panels configured to generate DC power; DC power storage configured to route the DC power to DC bus or store DC power from the DC bus; at least first DC-DC converter electronics configured for electrical connection of one or both of the plurality of solar panels or the DC power storage to the DC bus; a plurality of electric vehicle charging stations, each of the plurality of vehicle charging stations including a charging head and configured for electrical connection to the DC bus via at least second DC-DC converter electronics; and at least one controller. The at least one controller may be configured to perform any one, any combination (in any order) or all of: route power from the grid to the DC bus; route, via control of the at least first DC-DC converter electronics, the DC power from the plurality of solar panels to the DC bus; route, via control of the at least first DC-DC converter electronics, the DC power to or from the DC power storage; and route, via control of the at least second DC-DC converter electronics, the DC power to respective ones of the plurality of charging stations. Further, the grid-connected electric vehicle charging station system is configured for installation consisting of a behind-the-meter solution.

In one or some embodiments, a method for operating a grid-connected electric vehicle charging station system at a customer site that is configured for electrical connection to a utility grid. The method includes: using the grid-connected electric vehicle charging station that comprises: at least one DC bus; AC-DC converter electronics configured for electrical connection at the customer site and for electrical connection to the DC bus; a plurality of solar panels configured to generate DC power; DC power storage configured to route the DC power to DC bus or store DC power from the DC bus; at least first DC-DC converter electronics configured for electrical connection of one or both of the plurality of solar panels or the DC power storage to the DC bus; a plurality of electric vehicle charging stations, each of the plurality of electric vehicle charging stations including a charging head and configured for electrical connection to the DC bus via at least second DC-DC converter electronics; and at least one controller. The at least one controller: routes power from the utility grid to the DC bus; routes, via control of the at least first DC-DC converter electronics, the DC power from the plurality of solar panels to the DC bus; routes, via control of the at least first DC-DC converter electronics, the DC power to or from the DC power storage; and routes, via control of the at least second DC-DC converter electronics, the DC power to respective ones of the plurality of charging stations. Further, the grid-connected electric vehicle charging station system is installed as consisting of a behind-the-meter solution.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION OF THE INVENTION

Figure 1A:
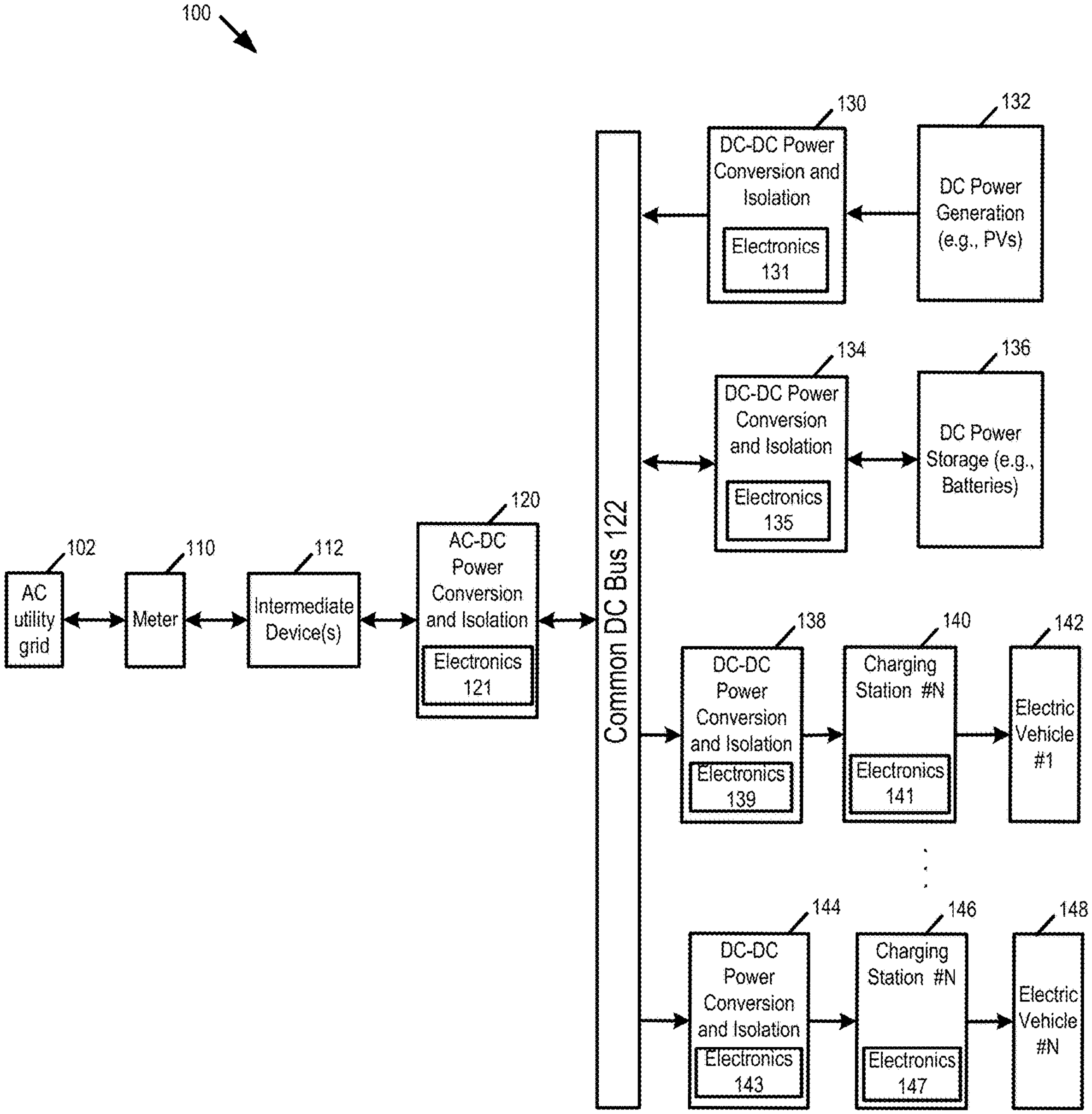
FIG. 1A is a block diagram illustrating a grid-connected electric vehicle charging station system using a common DC bus, DC power generation, DC power storage, and a plurality of electric machines for charging.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

A utility grid (interchangeably termed a grid or a power grid) may comprise generator(s); transmission lines; and distribution network(s). In particular, the power grid (interchangeably termed a grid or a macrogrid) may comprise an interconnected network for electricity delivery from producers to consumers. Power grids typically include power stations (interchangeably a power plant, generating station, or generating plant) that generate power; electrical substations (interchangeably termed substations) that step the voltage up or down; and electrical power distribution (interchangeably termed distribution networks) where the voltage is stepped down again to the required service voltage(s) for the end customers. In this regard, the electricity supply chain may comprise (or consists of) three primary segments: generation (where electricity is produced); transmission (which moves power over long distances via high-voltage power lines); and distribution (which moves power over shorter distances to end users (homes, businesses, industrial sites, etc.) via lower voltage lines). As discussed in more detail below, in one or some embodiments, the configuration of the grid-connected electric vehicle charging station system does not require any change in the section of the grid associated with distribution.

The generators may generate electricity in a variety of ways, such as using coal- and natural gas-burning power plants, hydroelectric dams, nuclear power plants, wind turbines, and solar panels. The generated electricity may be stepped up to high voltage (e.g., at least 110 KV) and carried using the transmission lines. In between the transmission lines and the end consumers (interchangeably termed end load, consumer users, or consumer site) are the distribution networks that include step-down transformers and substations and end with meters at the end consumers (e.g., homes, schools, businesses, etc.). In this regard, the utility grid comes to an end when electricity finally gets to the end consumer.

With regard to distribution, the power distribution system is the final stage in the delivery of electric power to individual customers. Distribution grids may be managed by IOUs, Public Power Utilities (municipals), and Cooperatives (co-ops) that operate both inter- and intra-state. Distribution systems, which may be typically rated below 34 kV, may tic directly into high-voltage transmission networks or be fed by sub-transmission networks via "step down" substations. Distribution circuits, also known as express feeders or distribution main feeders, may carry low-voltage power from the distribution substations to step-down transformers to the distribution network (e.g., the infrastructure, including the wiring, to distribute the voltage rated below 34 kV) closer to customer sites (e.g., homes, businesses, industrial sites, etc.) that further reduce the voltage and feed power to secondary circuits that serve residential and commercial customers.

In more detail, the distribution system carries electricity from the transmission system to individual consumers. Distribution substations connect to the transmission system and lower the transmission voltage to a medium voltage, such as ranging between 2 kV and 33 kV, with the use of transformers. Primary distribution lines may carry this medium voltage power to distribution transformers located near the customer's premises. Distribution transformers again may lower the voltage to the utilization voltage used by lighting, industrial equipment and household appliances. Often, a plurality of customers may be supplied from one transformer through secondary distribution lines. Commercial and residential customers may be connected to the secondary distribution lines through service drops (e.g., an overhead electrical line running from a utility pole to an electricity meter in a customer's premises).

In one or some embodiments, the transition from transmission to distribution may occur in a power substation, which may have the following functions: circuit breakers and switches enable the substation to be disconnected from the transmission grid or for distribution lines to be disconnected; transformers step down transmission voltages, 35 kV or more, down to primary distribution voltages (these may be medium voltage circuits, such as 600-35000 V); from the transformer, power may route to the busbar that may split the distribution power off in multiple directions (e.g., the bus may distribute power to distribution lines, which fan out to customers). Power distribution may be performed underground and/or via utility poles. Closer to the customer, a distribution transformer may step the primary distribution power down to a low-voltage secondary circuit, usually 120/240 V in the US for residential customers.

As discussed in the background, there is a dearth of electric vehicle charging stations. This is due, in part, to the high cost of installing the electric vehicle charging stations. As one example, installation of an electric vehicle charging station typically requires modification of the grid in order to supply the energy necessary to a plurality of electric vehicles. Such modification of the grid is costly, both in terms of monetary cost as well as administrative cost. As such, in one or some embodiments, a grid-connected electric vehicle charging station system is disclosed that does not rely on the grid interconnection as the primary source of the supply of energy necessary to charge the plurality of electric vehicles. Rather, the grid-connected electric vehicle charging station system may rely on the grid interconnection for backup power reserve and may primarily rely on a separate power source, such as a plurality of solar panels, for charging the plurality of electric vehicles. In a specific embodiment, the grid-connected electric vehicle charging station system may be seen as (and draw power similarly to) a typical end consumer of the utility grid, such as a typical home or a typical business. As one example, the grid-connected electric vehicle charging station system may electrically connect to an existing facility (such as an existing meter) of an end consumer of the utility grid and/or to a newly-installed facility (such as a newly-installed meter). As one example, the grid-connected electric vehicle charging station system may be electrically connected to one or more circuit breakers in an existing load panel or electrically connect to a newly installed load panel. As another example, the grid-connected electric vehicle charging station system may be electrically connected to a newly-installed meter and newly-installed load panel(s). As still another example, the grid-connected electric vehicle charging station system may be electrically connected to newly installed meter (and a newly installed load panel) that is below or electrically connected to an existing meter of the end consumer of the utility grid (e.g., the existing meter is already installed at the consumer site).

In one or some embodiments, installation of the grid-connected electric vehicle charging station system may not require installation of new hardware upgrades (such as on the utility side, including little to no hardware upgrades to the distribution system of the utility grid). In particular, in one or some embodiments, the configuration of the grid-connected electric vehicle charging station system does not require any change in the section of the grid associated with distribution, including no change in any one, any combination, or all of: in the substation (including no change in the circuit breakers and switches); in the transformers; in the busbar; in the utility poles or the wires supported by the utility poles; in the distribution transformer to step the primary distribution power down to the low-voltage secondary circuit; in the low-voltage secondary circuit; or in any of the wiring connecting any of the devices listed (including no change to the wiring connecting to the meter at the customer site). Alternatively, in the event that a new meter is installed at a customer site, in one or some embodiments, none of the distribution system need be modified (or only one or both of the low-voltage secondary circuit or the wiring from the low voltage secondary circuit to the newly-installed meter).

As one example, in one or some embodiments, when electrically connecting the grid-connected electric vehicle charging station system to an existing meter, no changes to the utility grid are needed. Rather, all changes may be behind the meter or behind the customer's interconnection to the grid at the customer site. As another example, in one or some embodiments, when electrically connecting the grid-connected electric vehicle charging station system to a newly-installed meter, no hardware upgrades to the utility grid (or even any changes at all to the utility grid) are needed; rather, only wiring may be needed to route power to an end consumer (e.g., modifying the distribution network to install a new interconnection at the customer site, such as by wiring from the utility pole to the newly-installed meter in the customer site). In one particular example when installing a new meter, conduit may be routed from the power company's source on the grid to the service point or meter at the customer site. Thus, the installation may necessitate the installation of the conductors, the electric meter, and optionally security seals on the load panel.

Merely by way of example, for a 400 Amp service, a single 3" conduit may be from the green box (e.g., a transformer on the grid side that is configured to transfer electrical energy from the grid to one or more meters, with the transformer either stepping down the voltage or not stepping down the voltage) to the newly-installed meter at the consumer site. The conduit may include a plurality of wires, such as four wires, 3 of which come from the grid and the fourth may comprise a bare wire connected to ground (acting as a grounding conductor). In this way, installation of the grid-connected electric vehicle charging station system may be similar or identical to installation for a typical home or a typical business (e.g., laying conduit for installation of a new meter), thereby more efficiently installing and/or operating the grid-connected electric vehicle charging station system. As still another example, when electrically connecting the grid-connected electric vehicle charging station system to a consumer site (which may comprise an electrical connection to a newly-installed meter at the consumer site or to an existing meter at the consumer site), no hardware upgrades to the distribution network are needed (again, no changes may be needed to the utility grid at all); rather, all changes are behind the meter at the consumer site. Regardless, the configuration of the system requires little to no upgrading of the utility grid.

Thus, in one or some embodiments, the grid-connected electric vehicle charging station system may comprise a reduced-footprint system from a grid-reliance standpoint. The reduced-footprint system may be manifested in any one, any combination, or all of the following ways: (1) connection to an existing facility at a customer site (without the need to install a new meter and without the need to modify the utility grid at all); (2) connection to an existing load panel at the customer site (without the need to install a new meter and without the need to modify the utility grid at all); (3) connection to a newly-installed load panel at the customer site (without the need to install a new meter and without the need to modify the utility grid at all); (4) connection to a newly-installed meter at the customer site (necessitating wiring in the utility grid for the newly-installed meter but without requiring any hardware upgrade to the utility grid); (5) limitation of any one, any combination, or all of AC voltage, AC power or AC current provided to the grid-connected electric vehicle charging station system to below predetermined amount(s) (e.g., less than 650 VAC so that the grid-connected electric vehicle charging station system may be installed within an existing customer site that uses less than 650 VAC); or (6) limitation by the grid-connected electric vehicle charging station system to drawing any one, any combination, or all of AC voltage, AC power or AC current to be less than the predetermined amount(s).

In one or some embodiments, the grid-connected electric vehicle charging station system may represent a balance in one or more respects. In one respect, the grid-connected electric vehicle charging station system may represent a balance in that multiple sources of power, including grid-connected power and renewable energy power (e.g., photovoltaic energy and/or battery storage energy), are used. In this regard, the grid-connected electric vehicle charging station system may be a hybrid-powered system of grid-connected power and non-grid-connected power. In another respect, the grid-connected electric vehicle charging station system may represent a balance in that the amount of power accessible from the grid is sized so that the grid-connected electric vehicle charging station system may be connected to an existing meter. Thus, the amount of power that may be accessed by the grid-connected electric vehicle charging station system may be a fraction of the amount of power generated by renewable sources (e.g., the power accessed from the utility grid in a single day is less than 50% of the power generated by the renewable sources; the power accessed from the utility grid in a single day is less than 40% of the power generated by the renewable sources; the power accessed from the utility grid in a single day is less than 30% of the power generated by the renewable sources; the power accessed from the utility grid in a single day is less than 25% of the power generated by the renewable sources; the power accessed from the utility grid in a single day is less than 20% of the power generated by the renewable sources; the power accessed from the utility grid in a single day is less than 15% of the power generated by the renewable sources; the power accessed from the utility grid in a single day is less than 10% of the power generated by the renewable sources; the power accessed from the utility grid in a single day is less than 5% of the power generated by the renewable sources). In this way, a respective grid-connected electric vehicle charging station system, which may include a plurality of charging stations, may receive power from the utility grid while minimizing (or entirely avoiding) changes to the utility grid in installing the respective grid-connected electric vehicle charging station system.

In particular, in one or some embodiments, the grid-connected electric vehicle charging station system may include: a DC bus (e.g., a nominally fixed-voltage common DC bus); the plurality of solar panels configured to generate DC electrical power; at least one DC energy storage device (e.g., one or more batteries) configured to store the DC electrical power and to discharge the DC electrical power on command; one or more DC-DC converter electronics configured for electrical connection of one or both of the plurality of solar panels or the DC energy storage to the DC bus; an AC-DC converter electronics configured for electrical connection to a standard utility grid connection (e.g., standard in terms of a standard connection for an end user of the utility grid) and for electrical connection to the DC bus (e.g., connection to the grid is via a single power conversion system (PCS) and an isolation transformer; electrical connection is at the meter (with no additional transformers or other hardware other than additional wiring and/or behind the meter); a plurality of electric vehicle charging stations (e.g., a plurality of isolated direct current fast chargers (DCFC)); and a controller that is configured to control each of the power from the plurality of solar panels, DC power storage, and the grid connection so that the electric vehicle(s) at the electric vehicle charging station(s).

As discussed in more detail below, in one or some embodiments, no modifications are performed on the grid side (such as the utility grid side) in installing or configuring the grid-connected electric vehicle charging station system. Rather, in one or some embodiments, the installation consists of modifications entirely on the consumer side, such as entirely behind the meter (such as a previously-installed meter). As one example, the installation may be entirely based on configuring a load panel that was previously installed at the site. In particular, the previously-installed load panel may already route power from the utility grid to powered devices existing at the site (e.g., HVAC, lighting, computers, etc.). The grid-connected electric vehicle charging station system may be electrically connected to the previously-installed load panel (e.g., to unused circuit breaker(s) of the previously-installed load panel or newly installed circuit breaker(s) on the previously-installed load panel). As another example, the installation may be entirely based on routing wiring from an already-installed meter on the site to a newly-installed load panel, with the grid-connected electric vehicle charging station system then being electrically connected to the newly-installed load panel (e.g., electrically connecting the grid-connected electric vehicle charging station system to circuit breaker(s) on the newly-installed load panel). In this regard, in one or some embodiments, installation of the grid-connected electric vehicle charging station system consists of no upgrading of any part of the utility grid (e.g., absolutely no modification of any part of the utility grid, including not laying any additional wiring or including additional hardware (such as transformers) in the distribution portion of the utility grid). Rather, in one or some embodiments, the installation is entirely under the control of the consumer, being entirely behind the meter.

Alternatively, in one or some embodiments, the grid-connected electric vehicle charging station system is installed with no upgrade to the distribution network. For example, the installation may comprise (or consist of) installing a new interconnection at the consumer site that is for routing power to the grid-connected electric vehicle charging station system at the consumer site. In such an instance, the installation of grid-connected electric vehicle charging station system may comprise: (i) electrically connecting at the site a new meter to the utility grid (e.g., routing conduit from the new meter to a utility pole or the like); (ii) installing a new load panel electrically connected to the new meter; and (iii) electrically connecting the grid-connected electric vehicle charging station system to the new load panel (e.g., to circuit breaker(s) of the new load panel). In this regard, the installation may consist of modification at one or both of at the meter or behind the meter. In this way, the grid-connected electric vehicle charging station system may be installed with little to no modification on the utility side of the grid (e.g., modification on the distribution network of the utility grid only to the extent to install a new meter), thereby comprising a low-footprint grid-connected electric vehicle charging station system. In effect, the grid-connected electric vehicle charging station system may comprise a balance between enabling power to be drawn from the utility grid and reducing (or eliminating) the modification required to the utility grid for installation.

In this way, the grid-connected electric vehicle charging station system may control the various sources of power, including with the grid interconnection (e.g., up to the power capacity of the grid connection), in order to recharge the electric vehicle(s) using the various sources of power. Moreover, because the power generation (e.g., PVs), storage (BESS), and load (DCFC+electric vehicle) are combined behind the AC interconnection, the load (e.g., the electric vehicle charging) may be served with minimal or even zero energy consumption from the electric grid.

Thus, because the grid interconnection for the grid-connected electric vehicle charging station system may be limited in capacity, the grid-connected electric vehicle charging station system may be applied to a variety of applications where the interconnection may be limited (e.g., existing fleet depots, corridor fueling stations/convenience stores, university campuses, and office parks, etc.). In this regard, the disclosed grid-connected electric vehicle charging station system may flexibly serve several vehicles intermittently fast-charging or optimizing the distribution of energy among many vehicles charging more slowly while parked at a destination or service center. Further, the grid-connected electric vehicle charging station system may be installed in many places where charging stations may need to be installed, particularly where it may be difficult to install more electrical power. So that, remote places, such as the desert, may still have charging stations installed due to the reduced interconnection to the grid without the need to build out new power lines. Such a low footprint charging station, reliant primarily on PVs and the batteries, thus may need only one interconnection (e.g., 1 MW or less) to configure the charging station(s).

Various types of electric vehicles for charging are contemplated. In one embodiment, road electric vehicles are contemplated for charging. Alternatively, or in addition, charging of non-road vehicles (e.g., mining vehicles, forklifts, construction vehicles, etc.) are contemplated. Still alternatively, the grid-connected electric vehicle charging station system may also be applied to DC microgrids (e.g., with loads other than electric vehicles).

Further, various architectures are contemplated. In one or some embodiments, the architecture includes at least one DC bus (e.g., such a single DC bus) in which the various elements, such as any one, any combination, or all of the grid interconnection, the DC power source (e.g., the plurality of solar panels), the DC power storage (e.g., the batteries), and the plurality of charging stations are electrically connected to (e.g., electrically connected via an AC-DC converter, in the case of the grid interconnection; electrically connected via a DC-DC converter, in the case of the DC power source, the DC power storage, or the plurality of charging stations; directly electrically connected in the instance where the DC voltage for the respective electrical device matches the DC voltage of the DC bus). For example, in one embodiment, each of the DC power source and the DC energy storage are electrically connected to the DC bus via a respective DC-DC converter. Alternatively, only one of the DC power source or the DC power storage is electrically connected to the DC bus via a respective DC-DC converter and the other is directed electrically connected to the DC bus without an intermediate DC-DC converter (e.g., the DC power storage is electrically connected to the DC bus via a DC-DC converter whereas the DC power source is electrically connected to the DC bus via a DC-DC converter; the DC power source is electrically connected to the DC bus via a DC-DC converter whereas the DC power storage is electrically connected to the DC bus via a DC-DC converter).

Alternatively, the architecture includes at least one DC bus (e.g., such a single DC bus) and at least one AC bus (e.g., such a single AC bus) in which the various elements, such as any one, any combination, or all of the following are electrically connected to one or both of the DC bus or the AC bus: the grid interconnection; the DC power source; the DC power storage; and the plurality of charging stations. As one example, separate charging station(s) may be connected to each of the DC bus and the AC bus (e.g., a first plurality of charging stations are connected to the DC bus and a second plurality of charging stations are connected to the AC bus). As another example, the grid interconnection may be electrically connected via an AC-DC converter to the DC bus and may be electrically connected without an intermediate AC-DC converter to the AC bus. As still another example, the grid interconnection may be electrically connected via an AC-DC converter to the DC bus and may be electrically connected via an intermediate AC-DC converter (such as the same AC-DC converter to the DC bus or a different AC-DC converter) and an intermediate DC-AC converter to the AC bus.

In one or some embodiments, one or more parts of the architecture may be modular in design including any one, any combination or all of: modularity of the solar panels; modularity of the batteries; or modularity of the charging stations. As one example, the solar panels may be arranged or configured in a modular manner in that different numbers of solar panels may be grouped together, from an architecture standpoint, so that each respective grouping of solar panels may have a separate electrical connection to the DC bus (e.g., each grouping of solar panels has a respective DC-DC converter for electrical connection to the DC bus). As another example, the batteries may be arranged or configured in a modular manner in that different numbers of batteries may be grouped together, from an architecture standpoint, so that each respective grouping of batteries may have a separate electrical connection to the DC bus (e.g., each grouping of batteries has a respective DC-DC converter for electrical connection to the DC bus).

As still another example, different charging stations may be modular in design based on rated output of the respective charging station. In particular, a first respective charging station may have a charging capacity of 1000 kW for its respective charging head, a second respective charging station may have a charging capacity of 2000 kW for its respective charging head, and a third respective charging station may have a charging capacity of 3000 kW for its respective charging head. In such an instance, each of the respective charging stations may have modular architecture based on its raged charging capacity (e.g., a single DC-DC converter rated for 1000 kW for the first respective charging station; two DC-DC converters in parallel, each rated for 1000 kW, for a total charging capacity for the second respective charging station of 2000 kW; three DC-DC converters in parallel, each rated for 1000 kW, for a total charging capacity for the third respective charging station of 3000 kW; etc.). Thus, the modularity of the architecture enables a flexible and configurable grid-connected electric vehicle charging station system.

In one or some embodiments, the grid-connected electric vehicle charging station system includes at least one controller. In a first specific embodiment, the at least one controller is configured for central control of the grid-connected electric vehicle charging station system. Alternatively, the at least one controller comprises distributed control in which controllers are associated with (e.g., resident in, proximate to, etc.) any one, any combination, or all of the following in order to control the following: the grid interconnection; the AC-DC converter(s); the DC-DC converter(s); the charging station(s); the DC power source; or the DC power storage. Still alternatively, the at least one controller may be configured for both central control and decentralized control.

In one or some embodiments, the control may comprise one or both of: stability of voltage in one or more parts of the architecture (e.g., autonomous common DC bus voltage stability via Droop Control); control of routing of power (such as DC power) to various parts of the system (e.g., routing of DC power to a respective one (or respective ones) of the charging stations).

In the instance where there is a combination of central and decentralized control, central controller(s) may be configured to manage higher-level functions. For example, when a new electric vehicle plugs into a respective charging station, the central controller may be configured to acknowledge the new electric vehicle and make general decisions as to how much power is routed to charge that new electric vehicle. In a particular example, if a plurality of electric vehicles are currently charging and consuming the maximum amount of power available, responsive to a new electric vehicle being plugged into a respective charging station, the central controller may decide which of the vehicles, including the new electric vehicle, receive power. As another example, where there is an unexpected occurrence (e.g., there is a fault or an electric vehicle is withdrawn from the respective charging station before being fully charged), the control may be distributed (at least in real time, such as milliseconds or microseconds). In particular, one, some, or all of the DC-DC converters may include controller-type functionality to determine the voltage on the common DC bus (at least at the DC-DC converter's respective node to the common DC bus) and generate an automated response (e.g., generate a correlated response. For example, responsive to an electric vehicle being disconnected from the head of its respective charging station prior to receiving a full charge, the respective DC-DC converter will "see" an instantaneous change in voltage on the common DC bus. In response, the respective DC-DC converter may respond (e.g., by lowering its current). Such an automated response may comprise an automated correlated response (e.g., the amount of voltage drop/increase may correlate to this amount of power drop or increase, such as a reduction in the amount of current. In this way, decentralized control, such as resident in any one, any combination or all of one or more of the converters (such as the DC-DC converters), the DC power source, the DC power storage, or the grid interconnection may contribute to the stability of the bus (such as the DC bus).

In one or some embodiments, the control, such as the centralized control, may be configured as a service, such as DC power as a Service (DCaaS) for various electric vehicle owners (e.g., fleet owners) and/or charging station operators. In DCaaS, the centralized control may be configured to query a respective owner of the electric vehicle and/or respective charging station operator in order to mete the DC power. In one or some embodiments, the query may be issued in real-time (e.g., when the respective owner of the electric vehicle plugs in his/her electric vehicle). Alternatively, the query may be made prior (e.g., prior to the respective owner of the electric vehicle plugs in his/her electric vehicle), with the response to the query stored in at least one memory, and thereafter accessed when the electric vehicle is plugged into the charging station.

Various queries are contemplated. One example query is indicative of priority of charging, such as relative to other electric vehicles currently charging and/or relative to different rates of charging (e.g., paying more results in a faster rate of charging). In practice, a respective owner may be queried; responsive to the answer to the query, the central controller may apportion the DC power for charging of the electric vehicle of the respective owner.

Thus, in one or some embodiments, the grid-connected electric vehicle charging station system need not have any one, any combination, or all of: dedicated power circuits; dedicated rectifiers (e.g., PCS); or isolation transformers for each charging station (e.g., dispenser/plug) to maintain the required galvanic isolation between electric vehicles and ensure 100% load utilization. This is unlike typical charging station systems. Further, load diversity (e.g., different power demands from different numbers of vehicles at different times) with the disclosed grid-connected electric vehicle charging station system may not result in overbuild or costly upgrades to the utility service infrastructure (e.g., interconnection), again unlike conventional topologies. Instead, the disclosed topology may allow for optimal system sizing with minimal (if any) required upgrades to service infrastructure. When combined with backup power blackstart kits (e.g., an outage or shutdown has occurred, with blackstart being used to transition back to operational), the system may deliver charging service during grid outages or peak demand load shedding events. Further, even during nominal operations, in one or some embodiments, grid energy consumption (e.g., amount of energy drawn from the grid) may be dropped to 0 during peak demand periods for reduced cost of energy).

Referring to the figures, FIG. 1A is a block diagram 100 illustrating a grid-connected electric vehicle charging station system using a common DC bus 122, DC power generation 132 (e.g., a plurality of solar panels, such as photovoltaics (PVs)), DC power storage 136 (e.g., one or more batteries), a plurality of charging stations 140, 146, and a plurality of electric vehicles 142, 148 for charging. Various electric vehicles are contemplated, including electric automobiles, electric trucks, etc. Further, in one or some embodiments, other electric devices, separate from vehicles, may be charged at the plurality of charging stations 140, 146.

FIG. 1A illustrates AC utility grid 102 and meter 110. AC utility grid 102 may be any part of an electric grid, such as any one, any combination, or all of: generator(s) (e.g., that generate electricity); step-up transformers to increase the voltage output from the generators to a transmission voltage; transmission lines; step-down transformers to step down the voltage to distribution; and distribution to the ultimate consumer (e.g., to connect to different meters).

The meter 110 (interchangeable termed an electricity meter) is a device that measures the amount of electric energy consumed by a site, such as a residence, a business, or the like. For example, for larger loads (e.g., more than about 200 ampere of load), current transformers may be used, so that the meter may be located somewhere other than in line with the service conductors. As discussed further below with regard to FIGS. 1D-F, various grid connections are contemplated, which may comprise installation of the grid-connected electric vehicle charging station system by one or both of: (i) modifications being limited to being behind-the-meter; or (ii) installing a meter at the site.

In this regard, the grid-connected electric vehicle charging station system may comprise a small footprint insofar as the connection to the utility grid. For example, the grid-connected electric vehicle charging station system may be connected to a standard meter, which may operate at no more than 600 V AC, at no more than 500 V AC, at no more than 240 V AC, at no more than 208 V AC, at no more than 120 V AC, etc. On the DC side, the grid-connected electric vehicle charging station system may operate at no greater than 1,500 V DC, at no greater than 1,000 V DC, etc. Thus, the grid-connected electric vehicle charging station system may be installed in a variety of locations (e.g., any metered location in a utility grid, such as an urban environment or a rural environment) for a variety of purposes (e.g., fleet depot; bus depot; distribution center; public charging station; etc.).

Further, as shown in FIG. 1A, block diagram includes a common DC bus 122, in which any one, any combination, or all of the AC utility grid 102 (via meter 110 and AC-DC power conversion and isolation 120), DC power generation 132 (via DC-DC power conversion and isolation 130), DC power storage 136 (via DC-DC power conversion and isolation 134), and the plurality of charging stations (e.g., charging station #1 (140) to charging station #N (146) via, respectively, a plurality of DC-DC power conversion 138, 144).

Thus, AC-DC power conversion and isolation 120 may be electrically connected to meter 110. In one or some embodiments, AC-DC power conversion and isolation 120 may be indirectly electrically connected to meter 110 (e.g., via one or more intermediate devices, such as intermediate device(s) 112, which may comprise a load panel, see FIGS. 1D-F). Alternatively, AC-DC power conversion and isolation 120 may be directly electrically connected to meter 110.

In one or some embodiments, the common DC bus 122 may be a nominally fixed-voltage DC bus architecture (+/−50 Vdc) leveraging peak power rating of PCS with increased system stability and shared infrastructure for reduced cost. In practice, the common DC bus 122 may drift slightly from its rated fixed voltage based on amount of power provided to and/or drawn therefrom (e.g., based on load connections to the common DC bus 122). Further, in one or some embodiments, galvanically isolated DC-DC converters may be used, which may enable safe operations using ground fault detection and isolation. In this way, the DC-DC converters may provide the necessary isolation and may prevent ground fault detection issues so that the charging stations may charge a respective electric vehicle with a predetermined voltage throughout the charging process using the same DC bus (e.g., the common bus).

As shown in FIG. 1A (and also in FIGS. 1B-C, 2A-D and 3A-B), the charging stations 140, 146 may be one or both of: (1) DC charging stations; and (2) isolated from one, some, or all of the other charging stations at the site. As discussed herein, various parts of the system may operate in the DC realm, such as DC power generation 132 and DC power storage 136. As such, the charging stations 140, 146 may also operate in the DC realm, thereby reducing loss in conversion to AC. Further, the charging stations 140, 146 may include a charging head (e.g., an electricity dispenser) through which the loads (e.g., the vehicles) may connect and be charged.

Various types of DC power generation 132 are contemplated. As one example, solar panels, which may comprise photovoltaics, may comprise a type of DC power generation 132. As discussed in more detail below, in one or some embodiments, the solar panels may be arranged or grouped in different groupings, with each grouping being separately electrically connected to the common DC bus 122. Various solar panels (interchangeably termed solar cell panel, solar electric panel, photo-voltaic (PV) module or PV panel) are contemplated. In one or some embodiments, the solar panel comprises an assembly of photovoltaic solar cells mounted in a frame, such as a rectangular frame. The solar panel may capture sunlight as a source of radiant energy, which may then be converted into electric energy in the form of DC electricity.

Various types of DC power storage 136 are contemplated. As one example, batteries may comprise a type of DC power storage 136. One example of a device using batteries is a battery energy storage system (BESS), which may comprise one or more batteries that store electrical energy for use at a later time. As discussed in more detail below, in one or some embodiments, the batteries may be arranged or grouped in different groupings, with each grouping being separately electrically connected to the common DC bus 122.

In addition, FIG. 1A illustrates various types of power conversion. One type of power conversion may convert alternating current (AC) into direct current (DC) and vice versa. For example, AC-DC conversion (see AC-DC power conversion and isolation 120) and DC-AC conversion (see DC-AC power conversion and isolation 174). In particular, an AC-DC converter is a device that converts an AC voltage to DC voltage. By way of example and not limitation, electricity supplied by the grid may be in 100V AC or 200V AC. The common DC bus 122 may operate at a DC voltage, such as at 950 Vdc. The AC-DC converter may be configured to convert from alternating current to direct current and to the desired constant voltage (e.g., 950 Vdc). In one implementation, the AC-DC converter may include a transformer with 2 magnetically coupled windings, with one winding (called the primary) that is driven by the AC supply and another winding (called the secondary) that serves as the power input to the AC-DC converter. The secondary winding may be connected to a full wave bridge rectifier, a smoothing capacitor, and a voltage regulator (e.g., to control the output of the AC-DC converter to the desired output DC voltage). Thus, any of the following may be perform the AC-DC conversion: rectifier; mains power supply unit (PSU); motor-generator; rotary converter; or switched-mode power supply.

Another type of power conversion may convert DC into another DC. In particular a DC-to-DC converter may comprise an electronic circuit or electromechanical device that converts a source of direct current (DC) from one voltage level to another. Thus, any of the following may be perform the DC-DC conversion: linear regulator; voltage regulator; motor-generator; rotary converter; or switched-mode power supply.

In practice, the various electronic devices, such as the DC power generation 132 or the DC power storage 136, may change its output DC voltage. As one example, the output of the DC power generation 132 (e.g., the PVs) may change based on solar radiance changes. As another example, the output battery voltage may change with the state of charge, temperature, etc. Thus, the DC-DC converters may ensure that the voltage supplied to the common DC bus 122 may be stable and predetermined.

As discussed in more detail below, at least one controller is configured to control the flow of power to and/or from various parts of the grid-connected electric vehicle charging station system including any one, any combination, or all of: power from DC power generation 132; power to and/or from DC power storage 136; power from the AC utility grid 102; or power to the charging station #1 (140) to the charging station #N (146).

In one or some embodiments, the at least one controller comprises a central controller configured to control any one, any combination, or all of: DC power generation 132; DC power storage 136; power from the AC utility grid 102; or power to the charging station #1 (140) to the charging station #N (146). Alternatively, the at least one controller comprises a plurality of controller that are distributed in the grid-connected electric vehicle charging station system. In one or some embodiments, the at least one controller may be resident in or associated with (e.g., separate but in communication with) any one, any combination, or all of electronics 121, 131, 135, 139, 141, 143, 147, 161, 165, 173. The distributed nature of the control may allow for real-time control (e.g., no more than 5 microseconds; no more than 10 microseconds; no more than 15 microseconds; no more than 20 microseconds; no more than 5 milliseconds; no more than 10 milliseconds; no more than 15 milliseconds; no more than 20 milliseconds; etc.).

Various types of control are contemplated. As one example, control of DC power generation 132 is responsive to receiving one or more commands for control. For example, in one embodiment, DC power generation 132 is configured route power it generates to the common DC bus 122 unless receiving a command not to rout the power. Responsive to receiving the command, DC power generation 132 routes the power generated by DC power generation 132 to ground. Alternatively, DC power generation 132 routes power it generates to the common DC bus 122 responsive to receiving a command to rout the power.

As another example, control of DC power storage 136 may be responsive to receiving one or more commands to store DC power and/or to route DC power to common DC bus 122. As yet another example, power from the AC utility grid 102 may be controlled via a command to AC-DC power conversion and isolation 120.

As yet another example, determination as to power to route a respective charging station, such as to charging station #1 (140) or charging station #N (146), may be triggered by connection of electric vehicle to the charging station via the charging head. In one or some embodiments, the respective charging station itself includes the intelligence to determine how much power is drawn from the common DC bus 122. Alternatively, or in addition, a central controller may be configured to determine the amount of power for the respective charging station to draw from the common DC bus 122 and to instruct the respective charging station accordingly.

Figure 1B:
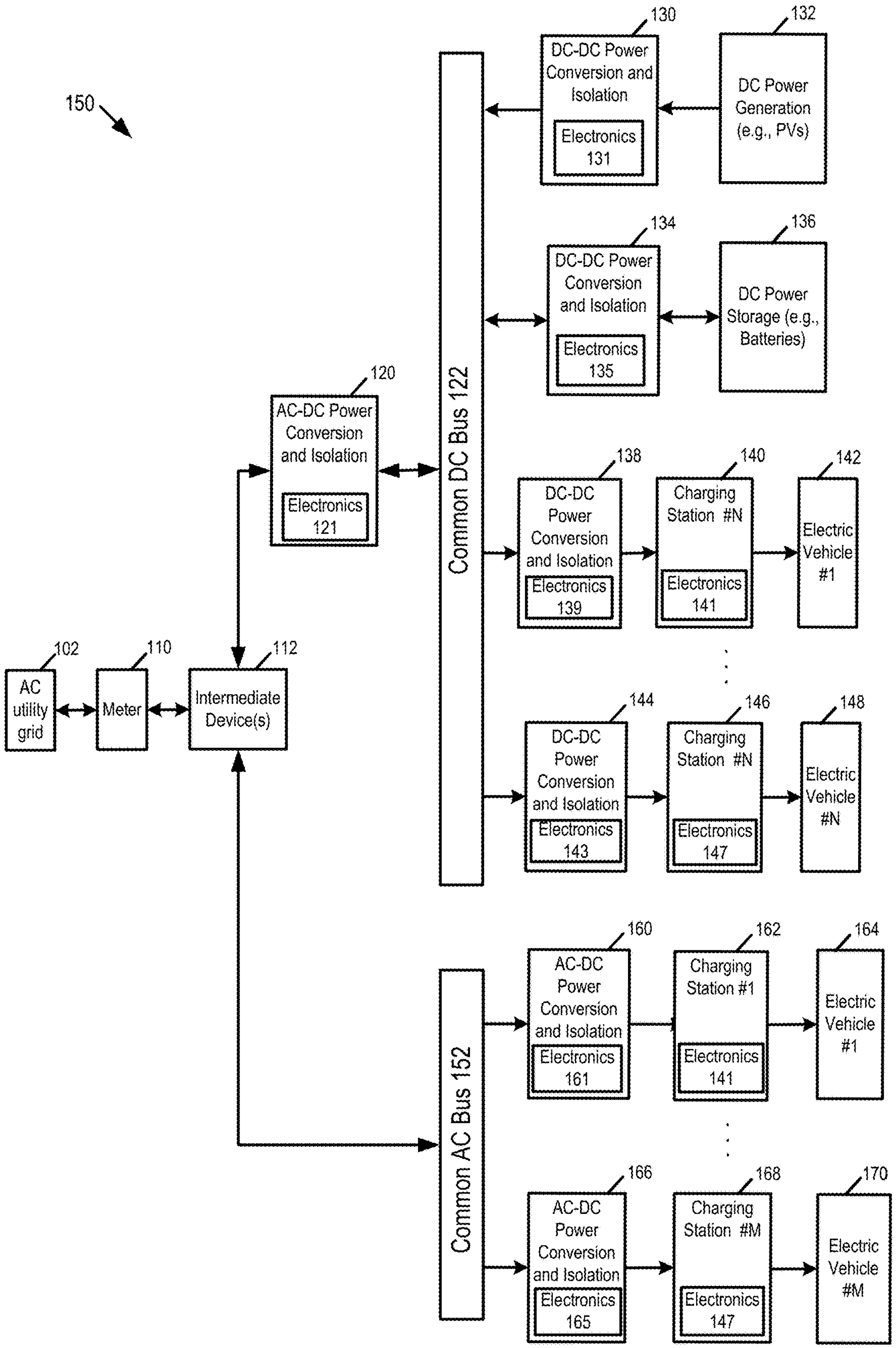
FIG. 1B is a first block diagram illustrating a grid-connected electric vehicle charging station system using a common DC bus and a common AC bus.

FIG. 1B is a first block diagram 150 illustrating a grid-connected electric vehicle charging station system using a common DC bus 122 and a common AC bus 152. As shown in FIG. 1B, common AC bus 152 is connected to intermediate device(s) 112 (without intermediate power conversion, such as AC-DC conversion). As shown, at least one charging station, such as a first plurality of charging stations (see charging station #1 (140) to charging station #N (146)) are electrically connected to common DC bus 122. Further, at least one charging station, such as a second plurality of charging stations (see charging station #1 (162) to charging station #M (168)) are electrically connected to common AC bus 152 via AC-DC Power Conversion and Isolation 160 and AC-DC Power Conversion and Isolation 166 in order to charge electric vehicle #1 (164) and to electric vehicle #M (170). In this way, the architecture may be hybrid in nature, having both a common DC bus 122 and a common AC bus 152.

Figure 1C:
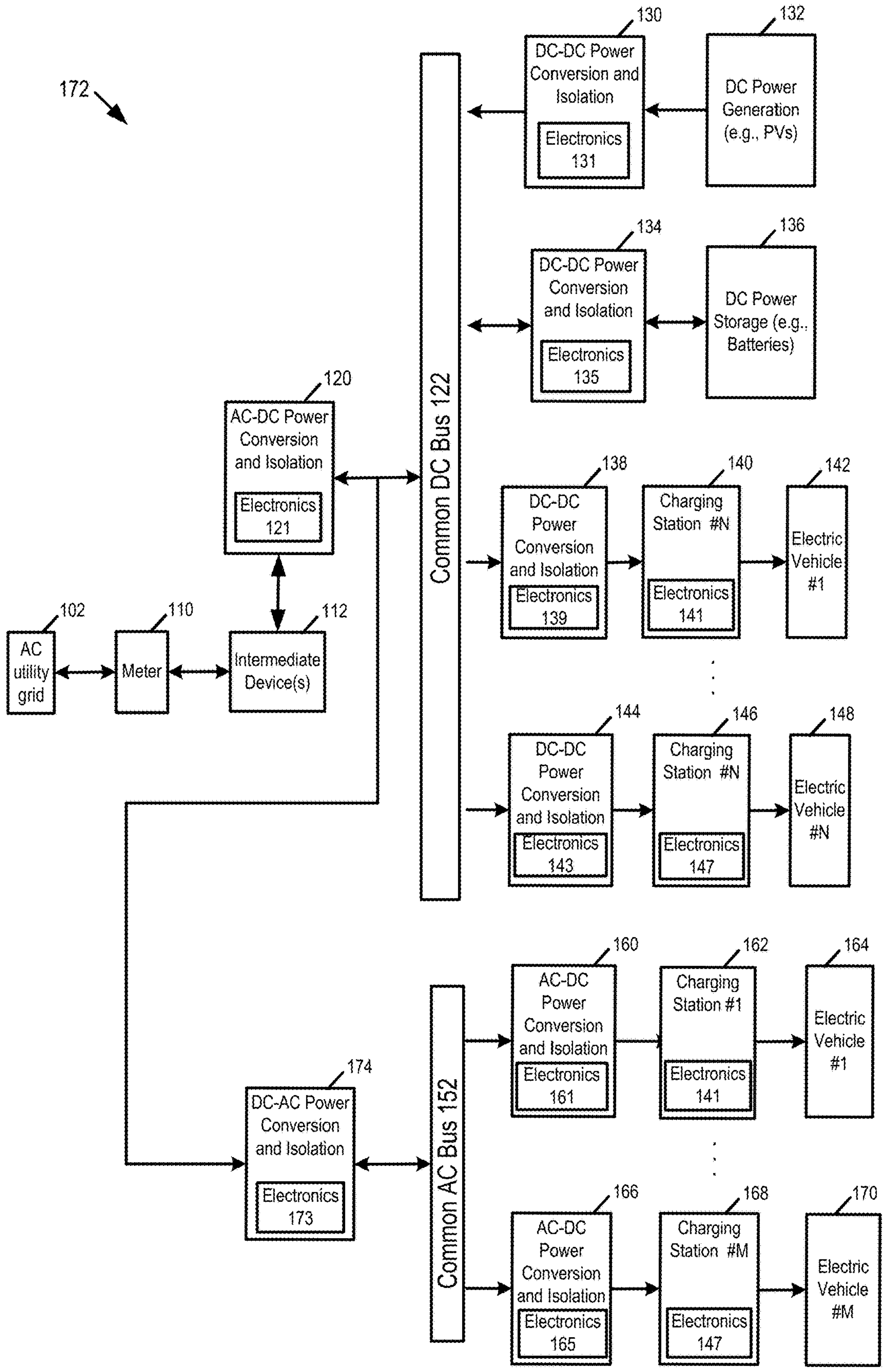
FIG. 1C is a second block diagram illustrating a grid-connected electric vehicle charging station system using a common DC bus and a common AC bus.

FIG. 1C is a second block diagram 172 illustrating a grid-connected electric vehicle charging station system using the common DC bus 122 and the common AC bus 152. As illustrated, common AC bus 152 is electrically connected to intermediate device(s) 112 via AC-DC Power Conversion and Isolation 120 and DC-AC Power Conversion and Isolation 174.

As discussed above, in one or some embodiments, the grid-connected electric vehicle charging station system may be electrically connected to the utility grid with little to no modification to the utility grid. In one or some embodiments, the installation of the grid-connected electric vehicle charging station system consists of changes behind the meter (such reconfiguring an existing load panel (see FIG. 1D) or as adding a load panel (see FIG. 1E)). Alternatively, or in addition, the installation of the grid-connected electric vehicle charging station system may consist of installing a new meter and an associated load panel (see FIG. 1F).

Figure 1D:
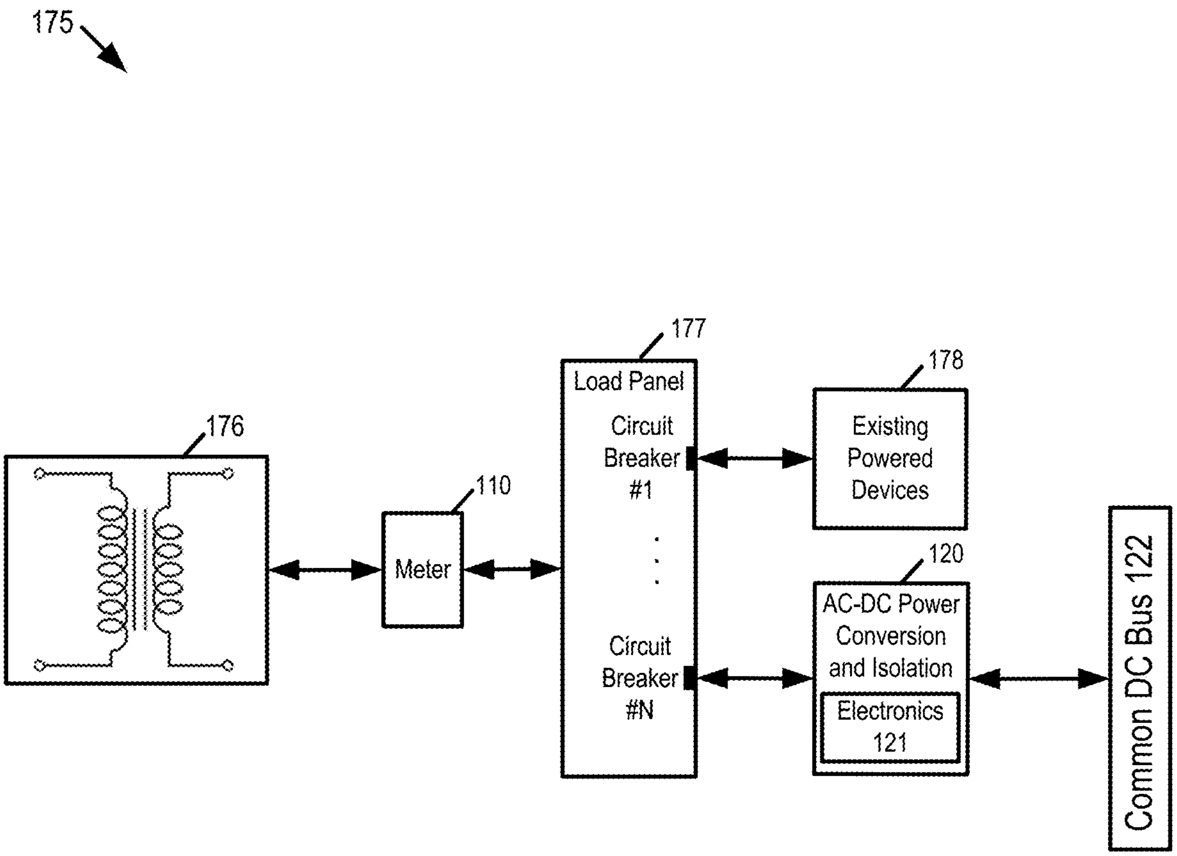
FIG. 1D is a block diagram of a first example of a behind-the-meter connection to the grid via a single load panel.

Referring back to the figures, FIG. 1D is a block diagram 175 of a first example of a behind-the-meter connection to the grid via a single load panel (e.g., the same load panel). The AC utility grid may comprise various hardware, such as transformer 176, which may be electrically connected via wire to meter 110. Meter 110 may be connected with load panel 177, which may include one or more circuit breakers, such as circuit breaker #1 to circuit breaker #N (where N is greater than 1). As shown, one or more circuit breakers on load panel 177 (which may have been previously installed) may be connected to existing powered devices 178, such as various electronic devices at the site (e.g., lighting, HVAC, outlets, etc.). Further, in configuring the grid-connected electric vehicle charging station system, the AC-DC power conversion and isolation 120 may be connected to one or more circuit breakers, such as circuit breaker #N. In this regard, the installation depicted in FIG. 1D shows that the installation necessitates no modification to any part of the utility grid and only necessitates modification behind the meter (on the consumer side). For simplicity, FIG. 1D does not include the electronic devices connected to common DC bus 122, such as elements 130, 132, 134, 136, 138, 140, 142, 144, 146, 148.

Figure 1E:
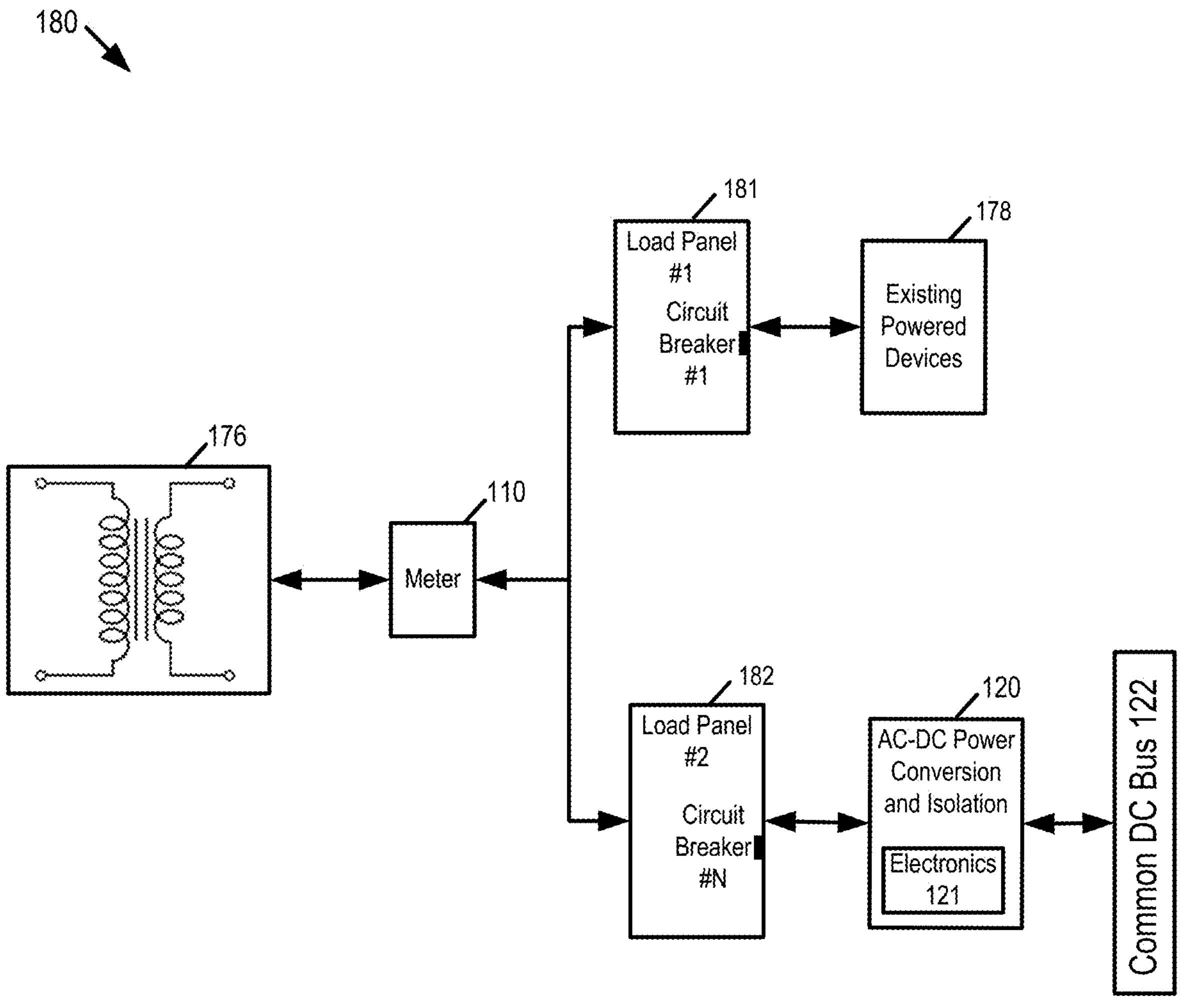
FIG. 1E is a block diagram of a second example of a behind-the-meter connection to the grid via a multiple load panel.

FIG. 1E is a block diagram 180 of a second example of a behind-the-meter connection to the grid via a multiple load panel. Specifically, installation of the grid-connected electric vehicle charging station system may comprise electrical connection of one or more panels (such as load panel #2 (182)) to meter (via electrical wiring) and installation of the grid-connected electric vehicle charging station system to the one or more panels (see AC-DC power conversion and isolation 120 connected to circuit breaker #N of load panel #2 (182). In this regard, the existing load panel(s), such as load panel #1 (181) and the electrical connections to the existing powered devices 178 need be unaffected in the installation of the grid-connected electric vehicle charging station system.

Figure 1F:
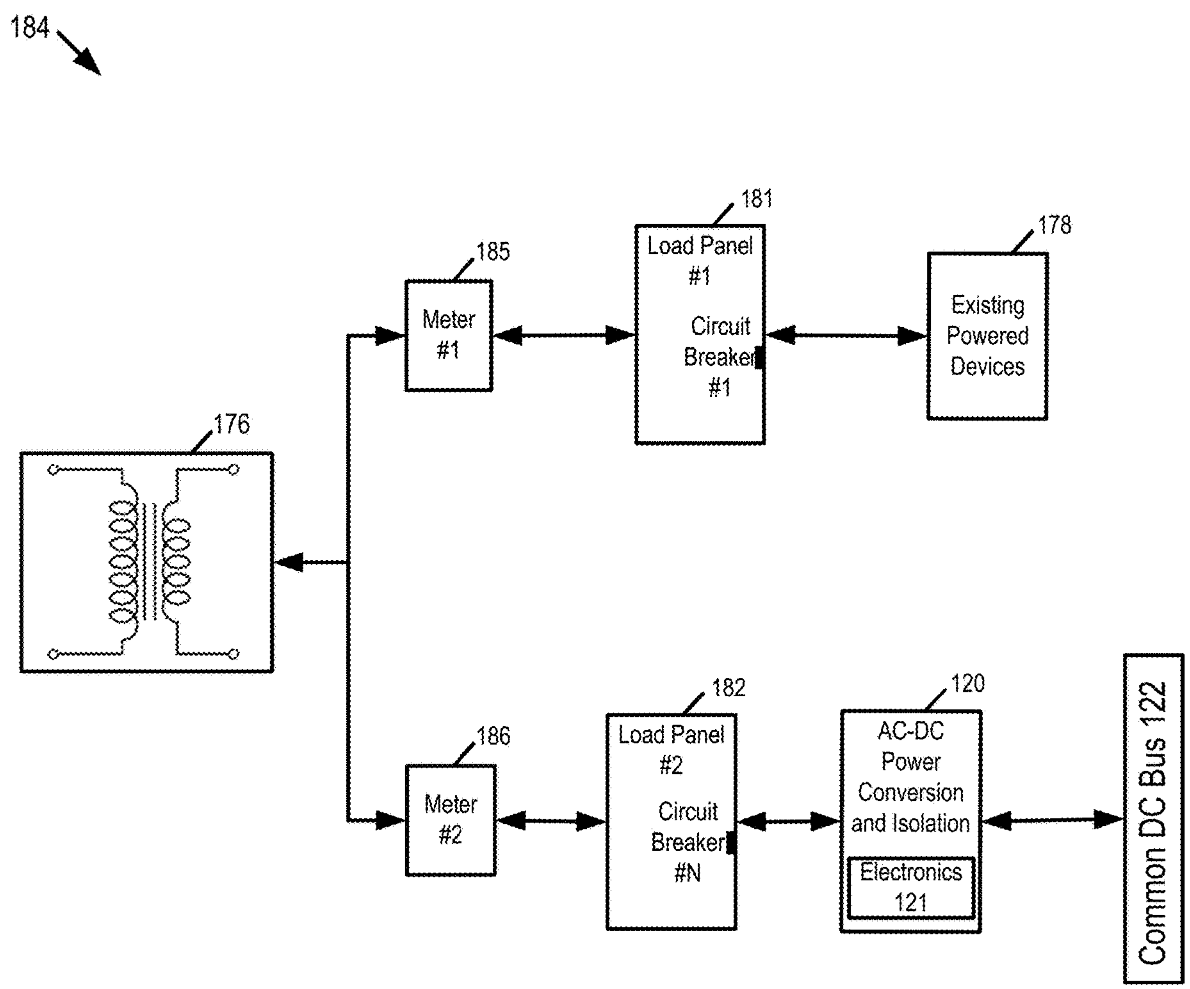
FIG. 1F is a block diagram of an example of a connection to the grid via a separately installed meter.

FIG. 1F is a block diagram 184 of an example of a connection to the grid via a separately installed point of interconnection (e.g., such as a newly-installed point of interconnection that comprises a separately installed meter). In one or some embodiments, a site may include a single point of interconnection (such as a single meter as illustrated in FIGS. 1D-E) or may include a plurality of points of interconnection (such as a plurality of meters as illustrated in FIG. 1F). For example, prior to installation of the grid-connected electric vehicle charging station system, the site may already have installed meter #1 (185), which may be electrically connected to load panel #1 (181) and the electrical connections and existing powered devices 178. Additional meter(s), such as meter #2 (186), may be installed, with electrical connection to the utility grid, such as illustrated by the electrical connection to transformer 176. Further, one or more load panels (such as load panel #2 (182)) may be electrically connected to meter #2 (186). In turn, the grid-connected electric vehicle charging station system may be connected to one or more circuit breakers of load panel #2 (182).

Figure 2A:
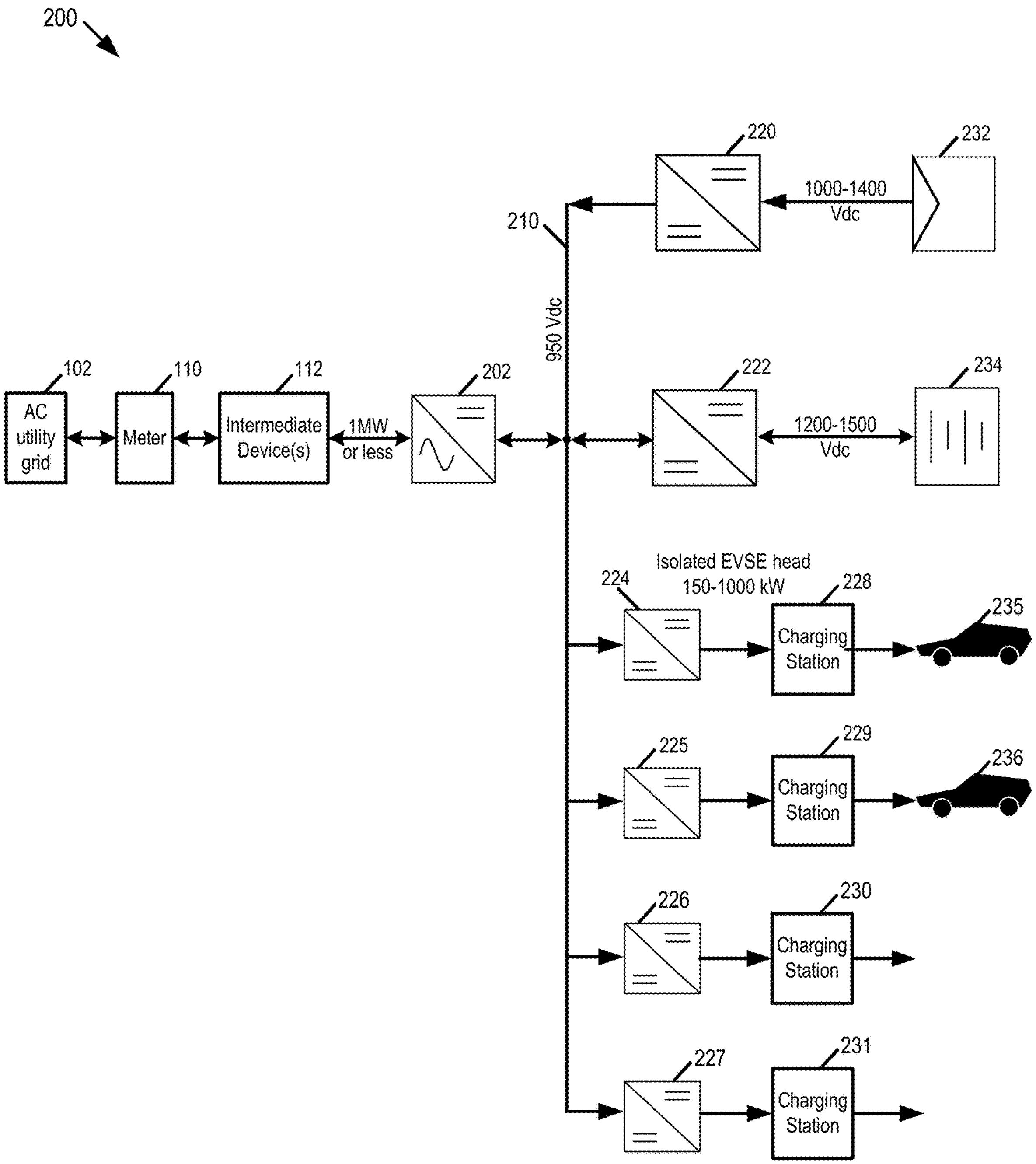
FIG. 2A is a first block diagram illustrating a grid-connected electric vehicle charging station system using a DC bus, PVs, batteries, and a plurality of charging stations, with DC-DC converters electrically connecting the PVs, batteries, and the plurality of charging stations to the DC bus.

FIG. 2A is a first block diagram 200 illustrating a grid-connected electric vehicle charging station system using a DC bus 210, PVs 232, batteries 234, and a plurality of charging stations 228, 229, 230, 231, with DC-DC converters electrically connecting the PVs 232, batteries 234, and the plurality of charging stations 228, 229, 230, 231 (with electric vehicles 235, 236 being charged at charging stations 228, 229, respectively) to the DC bus 210.

As discussed above, power conversion may be used to modify the AC output of the AC devices (e.g., intermediate device(s) 112, which may limit power consumption from the grid to the load panel rating, such as at most 1 MW). See AC-DC power converter 202. Alternatively, or in addition, power conversion may be used to modify the DC output of the DC devices. For example, the output generated by PVs 232 may be 1,000-1,400 Vdc may be converted to 950 Vdc to match the voltage on DC bus 210 using DC-DC converter 220. Still alternatively, or in addition, the output generated by batteries 234 may be 1,200-1,400 Vdc may be converted to 950 Vdc to match the voltage on DC bus 210 using DC-DC converter 222. In this regard, the DC-DC converters for the PVs 232 and the batteries 234 may be different from one another. Likewise, power conversion may be used to electrically connect the plurality of charging stations 228, 229, 230, 231 to DC bus 210 (e.g., DC-DC converters 224, 225, 226, 227 for charging stations 228, 229, 230, 231) so that electric vehicle supply equipment (EVSE), such as the charging stations, deliver to the isolated EVSE head 150-1000 kW.

Figure 2B:
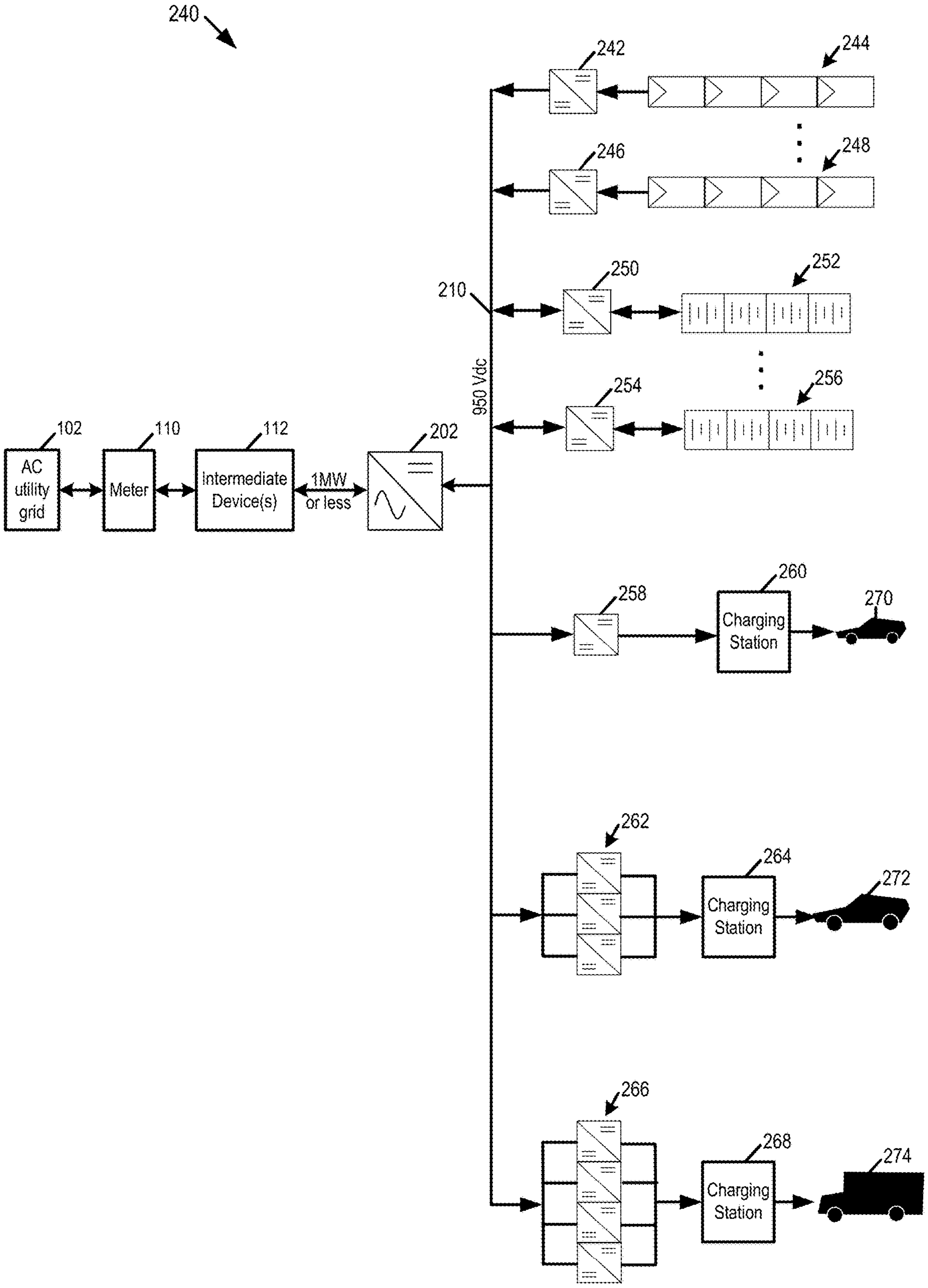
FIG. 2B is a second block diagram illustrating a grid-connected electric vehicle charging station system using a DC bus, PVs, batteries, and a plurality of charging stations, with modular DC-DC converters electrically connecting the PVs, batteries, and the plurality of charging stations to the DC bus.

FIG. 2B is a second block diagram 240 illustrating a grid-connected electric vehicle charging station system using a DC bus 210, PVs 244, 248, batteries 252, 256, and a plurality of charging stations 260, 264, 268, with modular DC-DC converters 242, 246 electrically connecting the PVs 244, 248, modular DC-DC converters 250, 254 electrically connecting batteries 252, 256, and modular DC-DC converters 258, 262, 266 the plurality of charging stations 260, 264, 268 (with electric vehicles 270, 272, 274 being charged by charging stations 260, 264, 268, respectively) to the DC bus 210. In particular, each grouping of PVs may have a respective DC-DC converter (see first grouping of PVs 244 having respective DC-DC converter 242 and second grouping of PVs 244 having respective DC-DC converter 246). Similarly, each grouping of batteries may have a respective DC-DC converter (see first grouping of batteries 252 having respective DC-DC converter 250 and second grouping of batteries 256 having respective DC-DC converter 254). Likewise, different charging stations may be rated with different capacities for charging based on the modular nature of the architecture. For example, DC-DC converter 258 includes a single DC-DC converter unit, whereas DC-DC converter 262 includes three DC-DC converter units and DC-DC converter 266 includes four DC-DC converter units. In one or some embodiments, each DC-DC converter unit includes the same capacity, so that charging station 264 may provide charging capability to electric vehicle 272 three times the charging capacity of charging station 260 to electric vehicle 270 and charging station 268 may provide charging capability to electric vehicle 274 four times the charging capacity of charging station 260 to electric vehicle 270. Thus, the DC bus 210 may act as the generic backbone to the system, with the modular DC-DC converters stacked together enabling flexible configuration tailored to the end needs of a respective charging station. This modular layout may be used to tailor the system for a one-system-configuration-fits-all strategy for any one, any combination, or all of: PV layouts; battery layouts; charging station layouts; or electric vehicle requirements.

For example, a common DC/DC converter architecture may be used to ensure interconnection of PVs 244, 248, batteries 252, 256, and the plurality of charging stations 260, 264, 268 (e.g., electric vehicle supply equipment (EVSE)) on a shared common DC bus 210. Such a design may be parallelable and/or scalable to serve various vehicles from small personal vehicles (at 50 KW levels, such as no more than 50 kW, no more than 60 kW, no more than 70 kW, no more than 80 kW, no more than 90 KW, no more than 100 kW, etc.), up to large long-distance vehicles (at least 2 MW). This is illustrated in FIG. 2B in which different types of vehicles may be charged. This may enable the same charging station configuration to serve both quick “refueling” of large numbers of daytime commuters as well as fewer faster charging medium or heavy duty vehicles overnight without unique infrastructure or the constant need to re-position vehicles in front of power limited fixed infrastructure. In this regard, the charging stations may be modularly configurable based on desired capacity for charging a respective electric vehicle.

Thus, FIG. 2B includes DC-DC converters 242, 246, 250, 254, 258, 262, 266, which in one embodiment, may be identical in capacity (e.g., providing the same change in voltage). Alternatively, DC-DC converters 242, 246, 250, 254, 258, 262, 266 may have different capacities.

Further, FIG. 2B illustrates an integration of advanced power electronics controls with modular (e.g., right-sized) power converters to enable a highly configurable system charging infrastructure design with minimal (or even zero) utility service upgrade requirements to serve a variety of electric vehicle charging profiles.

Figure 2C:
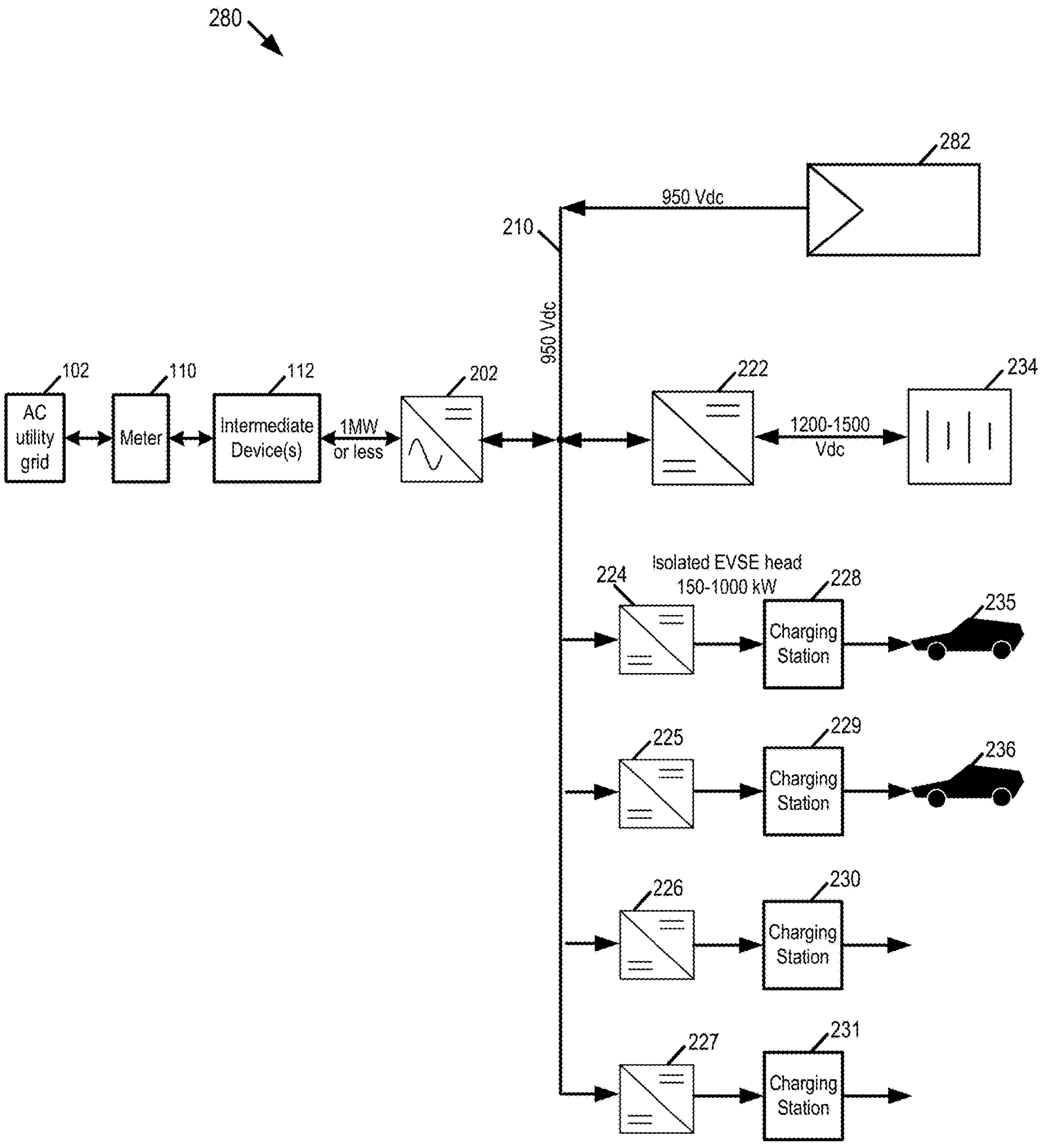
FIG. 2C is a third block diagram illustrating a grid-connected electric vehicle charging station system using a DC bus, PVs, batteries, and a plurality of charging stations, with DC-DC converters electrically connecting the batteries and the plurality of charging stations to the DC bus.

FIG. 2C is a third block diagram 280 illustrating a grid-connected electric vehicle charging station system using a DC bus 210, PVs 282, batteries 234, and a plurality of charging stations 228, 229, 230, 231 with DC-DC converters 224, 225, 226, 227 electrically connecting the batteries 234 and the plurality of charging stations 228, 229, 230, 231 to the DC bus 210. As shown in FIG. 2C, PVs 282 generate 950 Vdc. As such, connection to DC bus 210 (which operates at 950 Vdc) does not require a DC-DC converter.

Figure 2D:
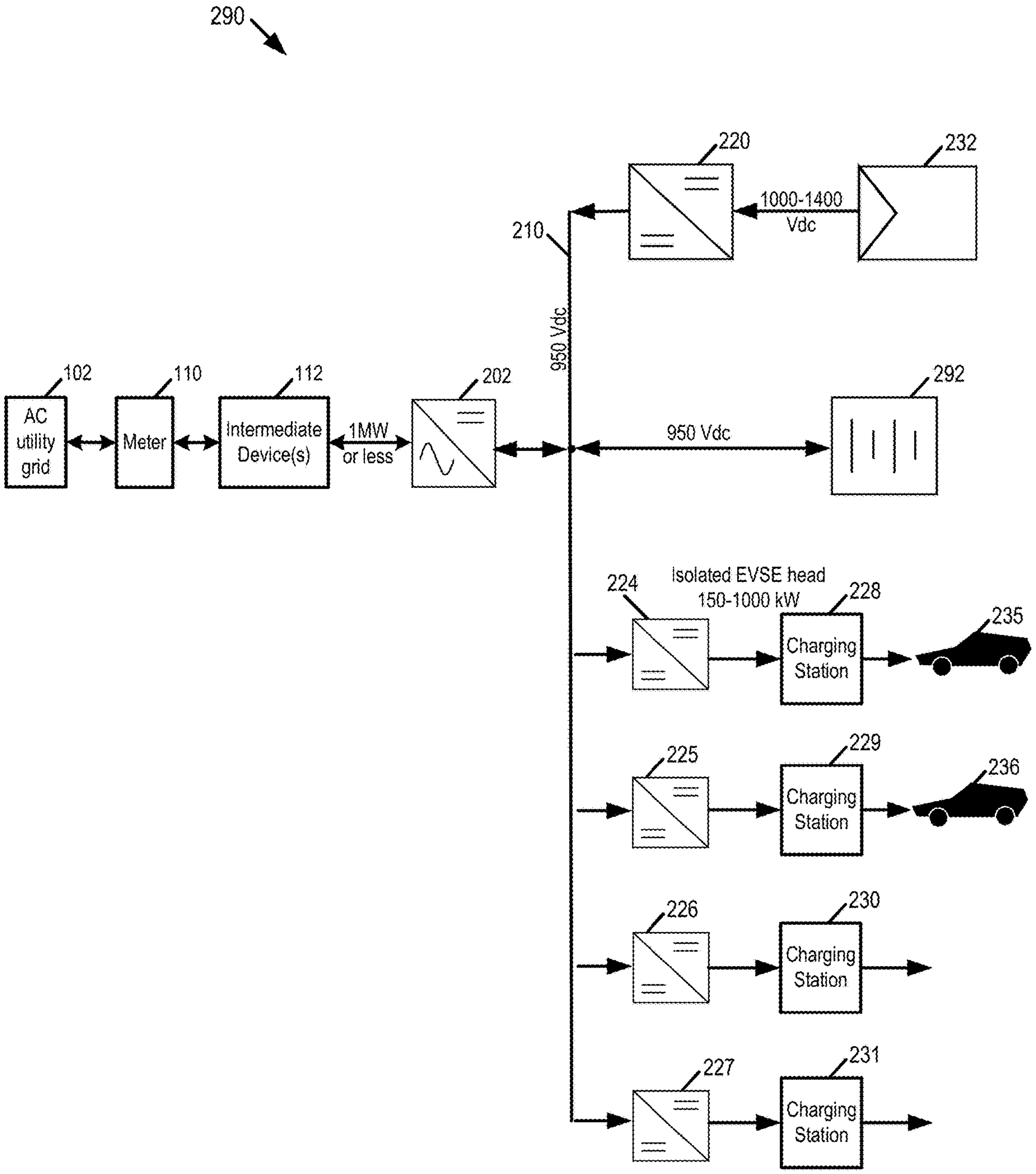
FIG. 2D is a fourth block diagram illustrating a grid-connected electric vehicle charging station system using a DC bus, PVs, batteries, and a plurality of charging stations, with DC-DC converters electrically connecting the PVs and the plurality of charging stations to the DC bus.

FIG. 2D is a fourth block diagram 290 illustrating a grid-connected electric vehicle charging station system using a DC bus 210, PVs 232, batteries 292, and a plurality of charging stations 228, 229, 230, 231 with DC-DC converters 224, 225, 226, 227 electrically connecting the PVs 232 and the plurality of charging stations 228, 229, 230, 231 to the DC bus 210. As shown in FIG. 2D, batteries 292 operate at 950 Vdc. As such, connection to DC bus 210 (which operates at 950 Vdc) does not require a DC-DC converter. Still alternatively, neither PVs nor batteries need to electrically connect to DC bus 210 if both PVS and batteries operate at 950 Vdc. Thus, as shown in FIGS. 2A-D, DC-DC converters may isolate the charging stations from the DC bus 210.

Figure 3A:
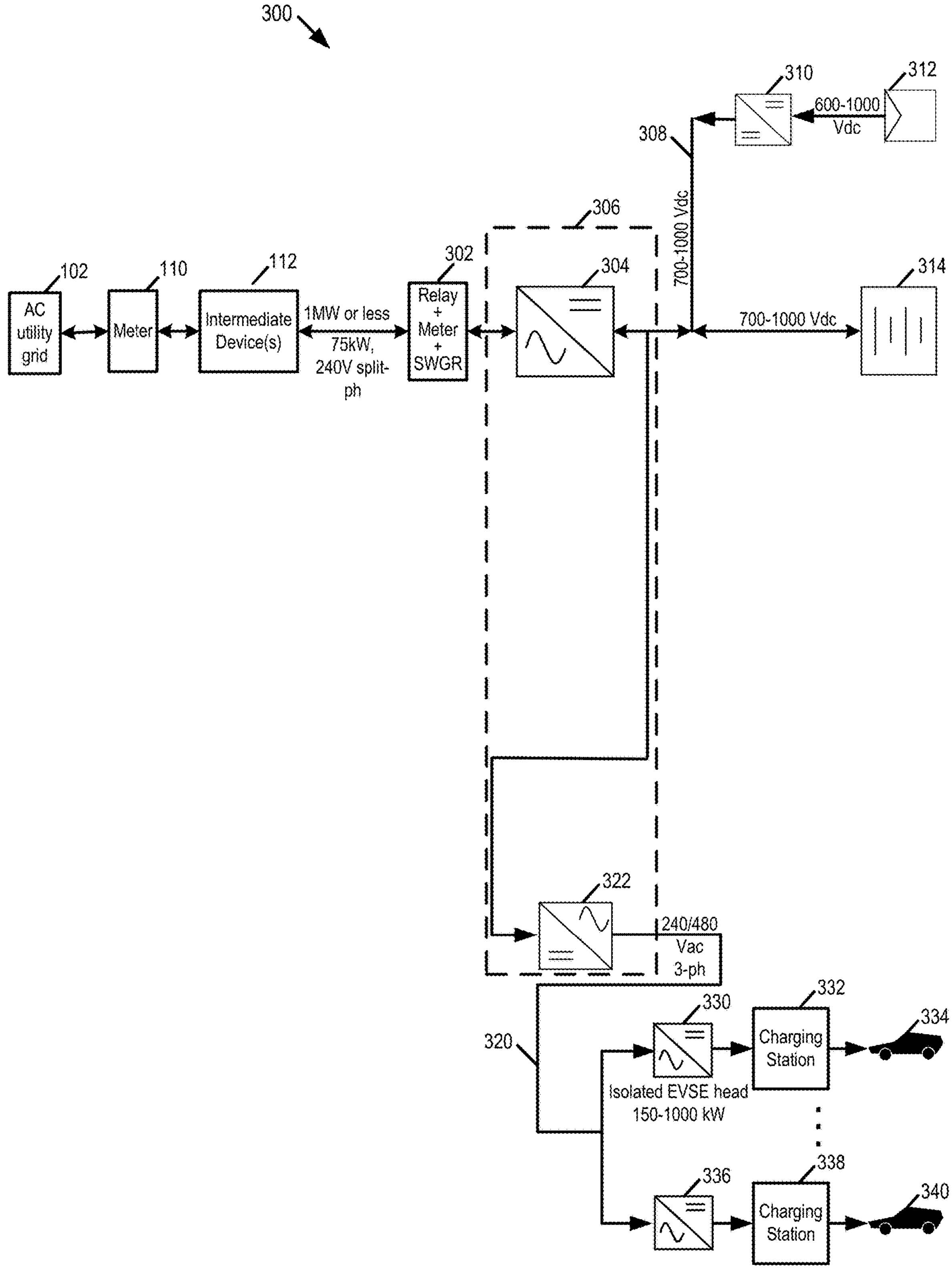
FIG. 3A is a first block diagram in which the electric vehicle charging station system is connected to the grid via a relay+meter+switchgear, in which the PVs and batteries are connected to a DC bus, and in which the plurality of charging stations are connected to an AC bus via AC-DC converters.

As discussed above, various configurations are contemplated, such as charging stations being electrically connected to a DC bus, being electrically connected to an AC bus, or different sets of charging station(s) being electrically connected to an AC bus or a DC bus. This is illustrated, for example, in FIGS. 3A-B. In particular, FIG. 3A is a first block diagram 300 in which the electric vehicle charging station system is connected to the AC utility grid 102 via intermediate device(s) 112, relay+meter+switchgear 302, and AC-DC converter 304, in which the PVs 312 and batteries 314 are connected to a DC bus 308, and in which the plurality of charging stations 332, 338 are connected to an AC bus 320 via DC-AC converter(s) 322 and AC-DC converter(s) 330, 336, respectively.

In one or some embodiments, relay+meter+switchgear 302 may comprise one or more relays, one or more meters, and one or more switchgears. The switchgear may be composed of any one, any combination, or all of electrical disconnect switches, fuses or circuit breakers used to control, protect and isolate electrical equipment. In one or some embodiments, the switchgear may be used both to de-energize equipment to allow work to be done and/or to clear faults downstream.

In one or some embodiments, DC bus 308 may operate in the range of 700-1000 Vdc. PVs 312 may operate at a different voltage (e.g., 600-1000 Vdc) from the DC bus 308, so that DC-DC converter 310 is used to electrically connect PVs 312 to DC bus 308. Conversely, batteries 314 may operate at the same voltage as DC bus 308 so that no DC-DC conversion is required.

Further, AC bus 320 may operate at 240/480 Vac 3-ph. As shown in FIG. 3A, AC bus 320 may be generated by inputting DC bus 308 into DC-AC converter 322 to generate the AC bus 320 output of 240/480 Vac 3-ph. In turn, the output of the AC bus 320 may be input to AC-DC converters 330, 336 to supply DC current to charging stations 332, 338 for charging electric vehicles 334, 340, respectively. Thus, FIG. 3A illustrates one way in which to generate both the DC bus 308 and the AC bus 320 using a plurality of converters, which comprises AC-DC converter 304 and DC-AC converter 306.

In this regard, FIG. 3A illustrates AC-DC converter 304 and DC-AC converter 322, which may replace a transformer. In doing so, the system may include DC bus 308, AC bus 320, and still have a relatively small point of interconnect. In one or some embodiments, AC-DC converter 304 and DC-AC converter 322 may comprise a high-frequency transformer, which has a very small footprint.

Figure 3B:
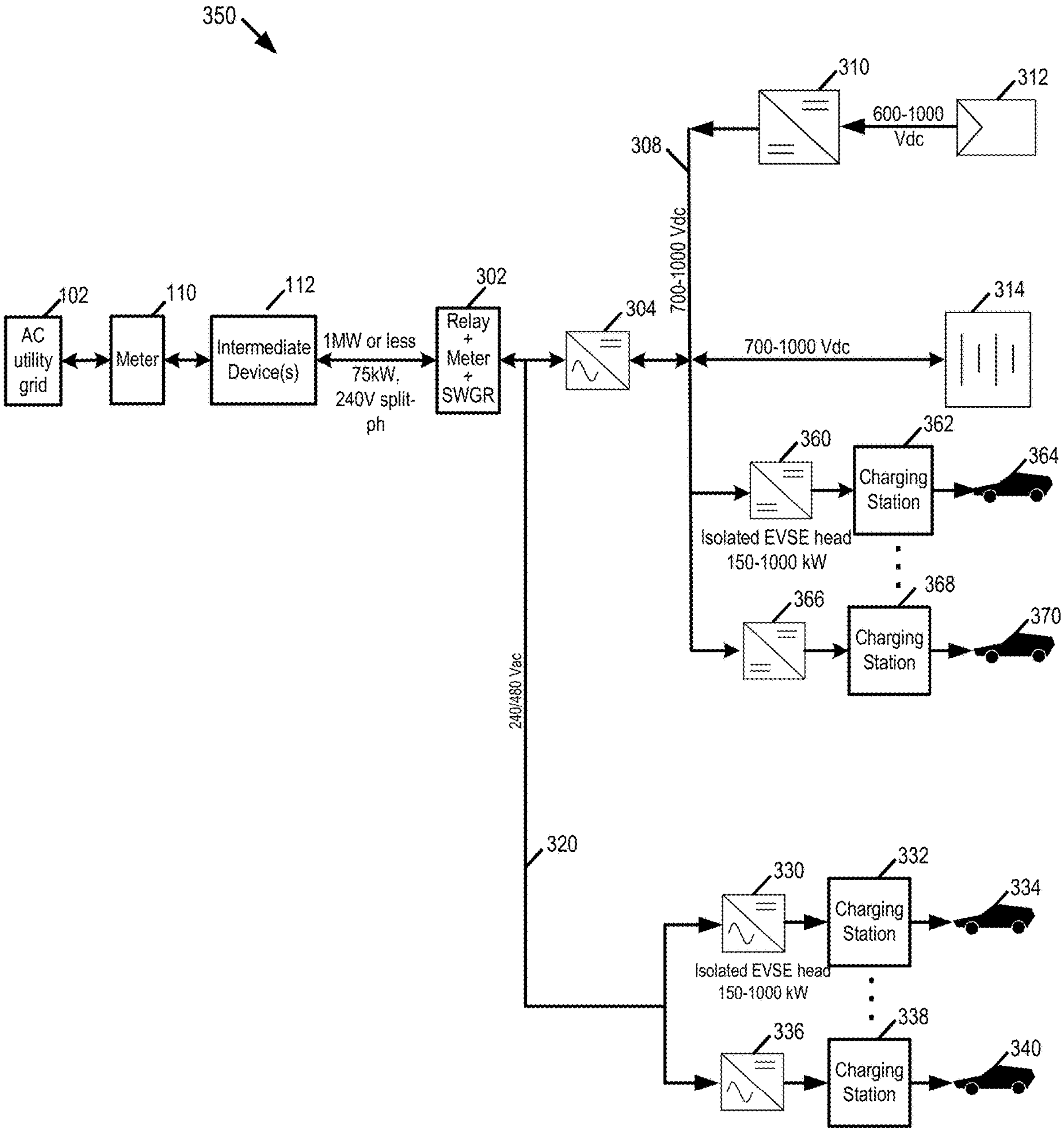
FIG. 3B is a second block diagram in which the electric vehicle charging station system is connected to the grid via a relay+meter+switchgear, in which the PVs, batteries, a first plurality of charging stations are connected to a DC bus, and in which a second plurality of charging stations are connected to an AC bus via AC-DC converters.

FIG. 3B is a second block diagram 350 in which the electric vehicle charging station system is connected to the AC utility grid 102 via a relay+meter+switchgear 302, in which the PVs 312, batteries 314, a first plurality of charging stations 362, 368 are connected to a DC bus 308, and in which a second plurality of charging stations 332, 338 are connected to an AC bus via AC-DC converters 330, 336. As shown, the first plurality of charging stations 362, 368 are electrically connected to a DC bus 308 via DC-DC converters 360, 366 in order to charge electric vehicles 364, 370.

Figure 4A:
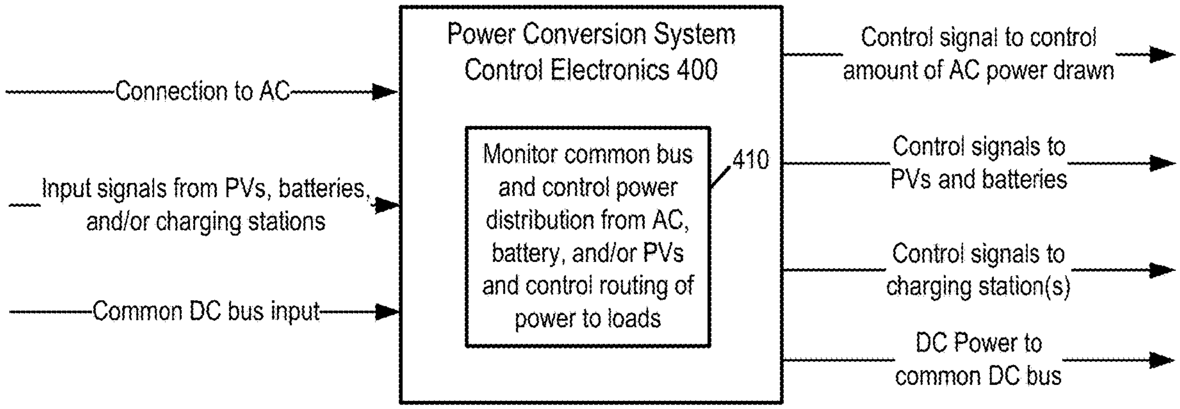
FIG. 4A is a block diagram of power conversion system control electronics.

FIG. 4A is a block diagram of power conversion system control electronics 400. As discussed above, the AC utility grid 102 may be electrically connected to common DC bus 122 via intermediate device(s) 112 and AC-DC power conversion and isolation 120. In one or some embodiments, a power conversion system (PCS) (e.g., an inverter or a rectifier) may perform one or both of intermediate device(s) 112 and AC-DC power conversion and isolation 120. In particular, in one or some embodiments, power conversion system control electronics 400 may be configured as a PCS, which may comprise the intermediary between the AC utility grid 102 and the common DC bus 122, so that power input via the AC utility grid 102 (as illustrated as connection to AC) is converted into DC power to the common DC bus 122. Further, because the majority of the power is supplied by the PVs 312, requiring minimal grid energy so that the PCS may be reduced in size and in turn reduced in cost.

Alternatively, or in addition, power conversion system control electronics 400 may be configured as a controller, such as controlling any one, any combination, or all of the electronic elements illustrated in FIG. 1A-C, 2A-D, or 3A-B. For example, power conversion system control electronics 400 may receive inputs from any one, any combination, or all of the electronic elements illustrated in FIG. 1A-C, 2A-D, or 3A-B, such as inputs from any one, any combination or all of the PVs, batteries, and charging station(s). In response, power conversion system control electronics 400, using monitor common bus and control power distribution from AC, battery, and/or PVs, and control routing of power to loads 410, may generate one or more control signals, such as any one, any combination, or all of: control signal(s) to control how much AC power is drawn from the AC utility grid 102; control signal(s) to PVs and/or batteries; or control signal(s) to charging station(s) to control amount to power to electric vehicle(s).

Figure 4B:
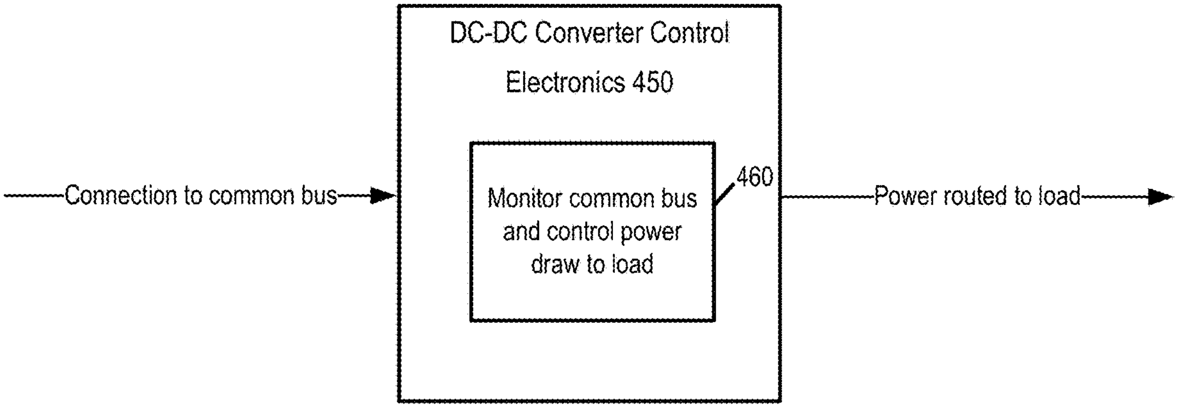
FIG. 4B is a block diagram of DC-DC converter control electronics.

Alternatively, or in addition, control may be decentralized, such as resident in the converters. As one example, the control may be resident in the DC-DC converter for a charging station, such as illustrated in FIG. 4B, which is a block diagram of DC-DC converter control electronics 450. As shown, DC-DC converter control electronics 450, which may comprise a DC-DC converter and at least one controller, is configured to input the voltage from the common DC bus. In response to fluctuations in the voltage from the common DC bus, monitor common bus and control power to draw load 460 of DC-DC converter control electronics 450 is configured to modify the amount of power sent to the load.

As discussed above, one or more parts of the system may implement control. In one or some embodiments, the system control is manifested in at least one central controller configured to manage high-level functions. For example, when a new electric vehicle plugs into a respective charging station, the central controller may be configured to acknowledge the new electric vehicle and make general decisions as to how much power is routed to charge the new electric vehicle (e.g., if there are already three other vehicles plugged in that are consuming the maximum amount of power available, and then the new electric vehicle is plugged in, the central controller is configured to decide how to divide the power amongst the four electric vehicles that are now charging). As such, the central controller may be configured to make longer-term decisions as to the apportionment of power. In one or some embodiments, shorter-term decisions, such as on a timescale of milliseconds or microseconds, may be made in a decentralized manner. For example, where loads change or where there is a fault (e.g., the electric vehicle is unplugged from the charging station prior to being fully charged), the system may be configured for a more intuitive distributed response. In particular, in one or some embodiments, described further below, one, some or all of the DC-DC converters may sense the voltage on the common bus, which may change instantaneously due to a fault, premature unplugging, etc. In response to sensing the change, the DC-DC converters may be configured to respond accordingly (e.g., lower their current). The DC-DC converters' may generate an automated response, which may comprise a correlated response (e.g., linear or non-linear) in that the amount of voltage drop/increase correlates to of amount of power drop/increase (e.g., a reduction in the amount of current). As discussed above, the central controller or the decentralized controller(s) may be implemented in various parts of the system, such as in the PCS, in various DC-DC converters, or the like.

In this regard, in one or some embodiments, the central controller may perform one or both of the following: energy management; or power management. With regard to energy management, the central controller may determine the amount of power generation that is available and may balance the energy available (e.g., including forecasting solar power generation on a day-to-day basis; determining the amount of grid power available, such as 24 MW hours available for a 1 MW/h grid connection) so that the central controller may determine how to distribute the energy available (e.g., charge different vehicles at a different rates (e.g., charge electric vehicles at a different power levels). With regard to power management, the central controller may, at any given time, balance the load (e.g., whether charging the electric vehicles, charging batteries, etc.) with the power generation. Various power balancing may be performed on the millisecond/microsecond scale, as discussed above, in order to maintain a stable voltage on the common bus.

Thus, in one or some embodiments, a controller, such as a central control may determine any one, any combination, or all of: when a respective vehicle is charged (e.g., immediately or at a future predetermined time); how much the respective vehicle is charged (e.g., the amount of power provided for charging the vehicle); or the priority of the respective vehicle in charging. As discussed further below, in one or some embodiments, the determination may be based on input (such as previously provided input or real-time input). For example, a respective electric vehicle owner may be presented with an option for surge pricing so that the respective electric vehicle owner may pay for priority in charging. Alternatively, each of the respective electric vehicles presented for charging may pay the same amount regardless of input. Still alternatively, or in addition, the controller may determine the amount of power provided to a respective electric vehicle based on the needs of the electric vehicle itself (e.g., size of the battery (e.g., larger or smaller) and/or the current amount of charge of the battery (e.g., a battery with higher charge may be given higher priority in order to more quickly fully recharge the battery; or a battery with lower charge may be given higher priority in order to more quickly fully recharge the battery). In this way, the charging may comprise a DC charging as a Service that is configurable.

Further, in one or some embodiments, the controller may be configured to determine whether and/or when to access AC power from the grid. The controller may estimate future need, future capacity (e.g., from PVs and batteries) and costs of accessing the grid (e.g., based on a rate schedule for accessing power from the grid) in order to determine whether and/or when to access the AC power from the grid.

Figure 5A:
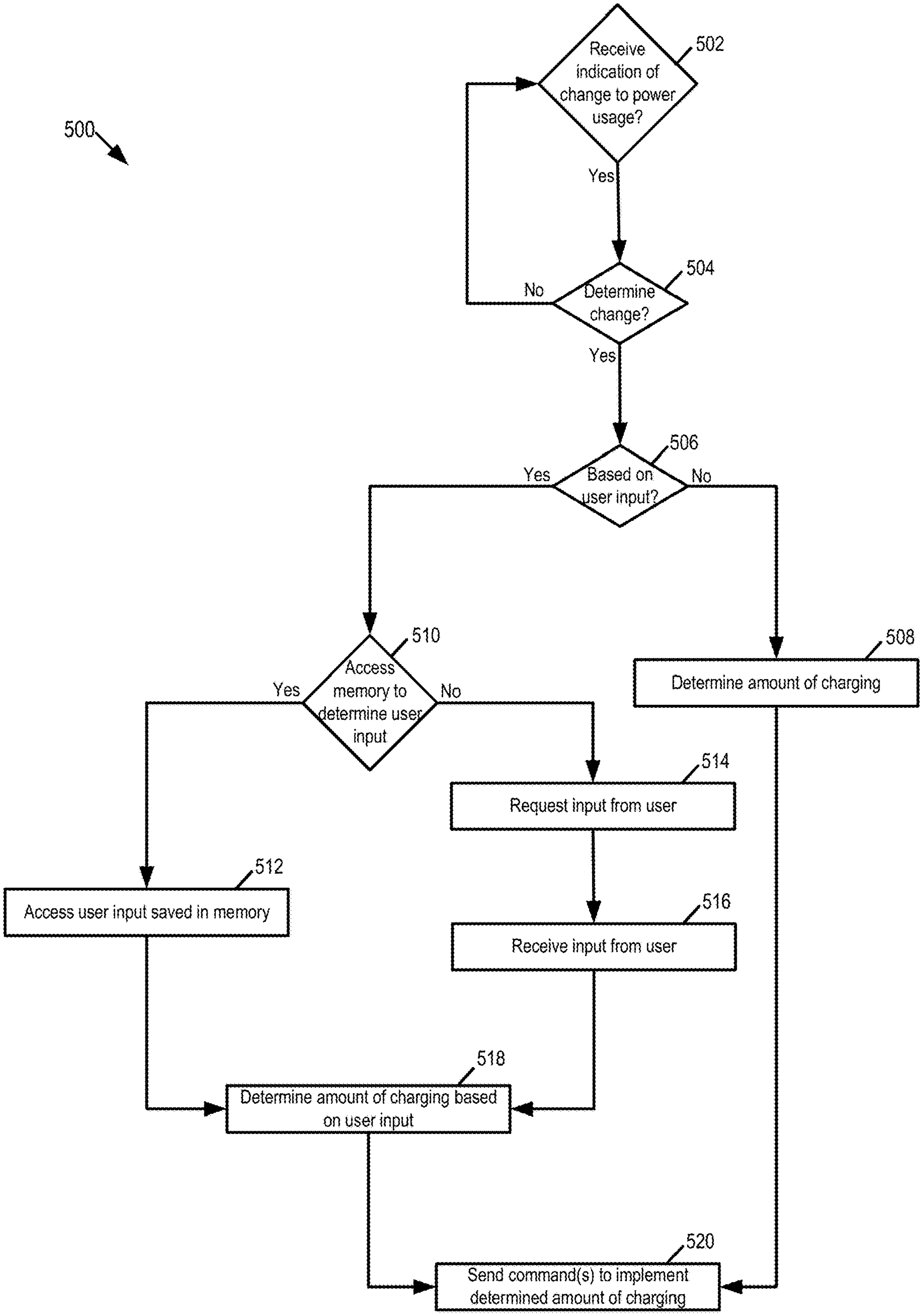
FIG. 5A a flow diagram for a central controller to determine the amount of charging for an electric vehicle.

FIG. 5A a flow diagram 500 for a central controller to determine the amount of charging for an electric vehicle. As discussed above, a central controller may be configured to determine which electric vehicles receive charge and/or how much charge. In one or some embodiments, the central controller may be triggered to begin this process in response to at 502 receiving an indication of a change to power usage. For example, an electric vehicle may be connected to the head of a charging station, resulting in one or both of a change in the power drawn from the common DC bus or a communication sent from the charging station to the central controller requesting charge be routed to the charging station.

At 504, the central controller determines whether it is tasked with determining the change to the power drawn from the DC common bus. If not, flow diagram 500 loops back to 502. If so, at 506, it is determined whether to access user input in making the determination. If not, at 508, the central controller makes the determination without user input. If so, at 510, it is determined whether to access a memory to determine user input (based on a previously stored indication of user input) or to solicit user input in real time. If it is determined to access a memory, at 512, the user input is accessed in memory. If not, at 514, input is requested from the user and at 516, the input is received from the user. After which, at 518, the central controller may determine the amount of charging based on the user input, with the command(s) to implement the amount of charging being sent at 520. In this way, the system may consider user input in making decisions regarding charging. In one implementation, the user input may be used as a basis for a DC as a Service (DCaaS) model for individual electric vehicle owners, fleet owners, and/or station operators. By way of example, a user may be queried, either in real time or prior, as to any one, any combination, or all of: the speed of charging; the priority of charging; the number of electric vehicles for charging; the different capabilities of electric vehicles of charging (e.g., different sizes of batteries); the current state of charge of the electric vehicles subject to charging; etc.

Figure 5B:
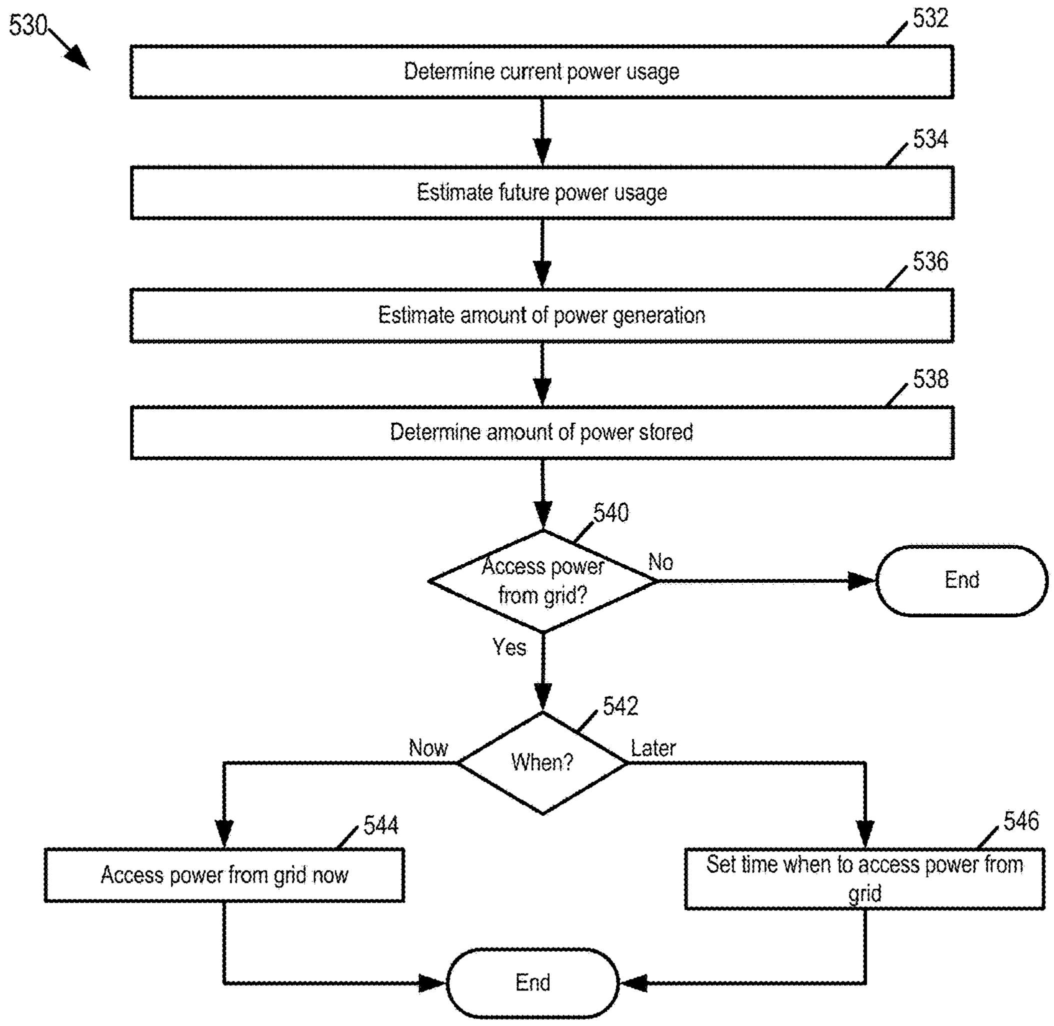
FIG. 5B a flow diagram for determining whether and/or when to access the grid for power.

FIG. 5B a flow diagram 530 for determining whether and/or when to access the grid for power. At 532, current power usage is determined. At 534, future power usage is estimated. At 536, the amount of power generation is estimated (e.g., how much power will be generated by the PVs). At 538, the amount of power stored is also determined. Given the current/future power usage, the estimated power generation, and the power stored, at 540, the controller may determine whether to access power from the grid. If so, at 542, it may further be determined when to access the power grid, such as now (at 544) or later (at 546, setting a time when to access power from the grid).

Figure 5C:
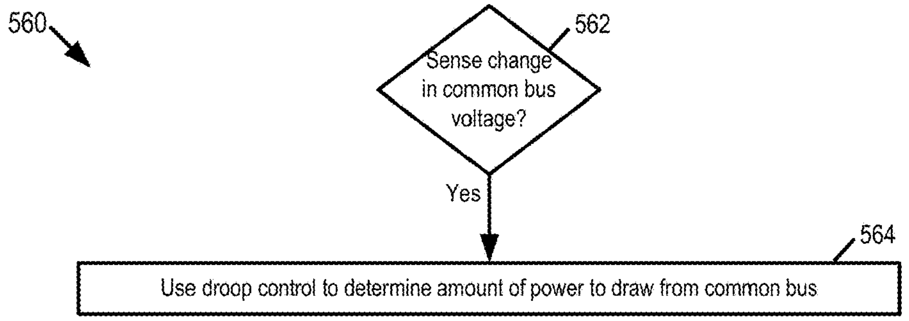
FIG. 5C is a flow diagram for a decentralized controller to determine an amount of power to draw from the common bus.

FIG. 5C is a flow diagram 560 for a decentralized controller to determine an amount of power to draw from the common bus. At 562, a device, such as the DC-DC controllers, may sense whether there is a change in common bus voltage. If so, at 564, the device may use droop control to determine amount of power to draw from common bus. In this way, stable droop-based common DC bus control may be implemented with power-flow management site SCADA in order to perform stability management of the DC bus.

Thus, the various architectures disclosed may include a common bus, such as one or both of a common DC bus or a common AC bus, with branches on the common bus. In one or some embodiments, one, some or each branch from the common DC bus may include a DC-DC converter, which may: (i) stabilize the common DC bus; and (ii) provide reliable DC voltage behind the DC-DC converter (e.g., to the charging station for charging the electric vehicle). In one embodiment, the DC-DC converter topology may engender decentralized control. Alternatively, one of the DC-DC converters may comprise a master controller that is in charge. In either instance, balancing of power may occur (e.g., stronger DC-DC converters may provide more power and weaker DC-DC converters may provide less, with monitoring and feedback that may be provided for each individual DC-DC converter).

In one or some embodiments, certain functions (such as for planned events such as when charging of an electric vehicle is to begin or to end) may be controlled by a master controller. The master controller may be resident offsite (in the event that communications are sufficiently enough) or onsite (e.g., within or in communication with the PCS). Alternatively, or in addition, other functions (such as unplanned events) may be determined in a decentralized manner.

In all practical applications, the present technological advancement must be used in conjunction with a computer, programmed in accordance with the disclosures herein. Merely by way of example, various devices disclosed in the present application may comprise a computer or may work in combination with a computer (e.g., executed by a computer), such as, for example, in block diagrams in FIGS. 1A-4B or in flow diagrams FIGS. 5A-B. Merely by way of example, computing functionality may be manifested in the one or more electronic devices, such as in electronics 114, 121, 135, 139, 141, 143, 147, 161, 165, 173 (by way of example), or the like. As such, computing functionality may be resident within any of the electronic devices discussed herein.

Figure 6:
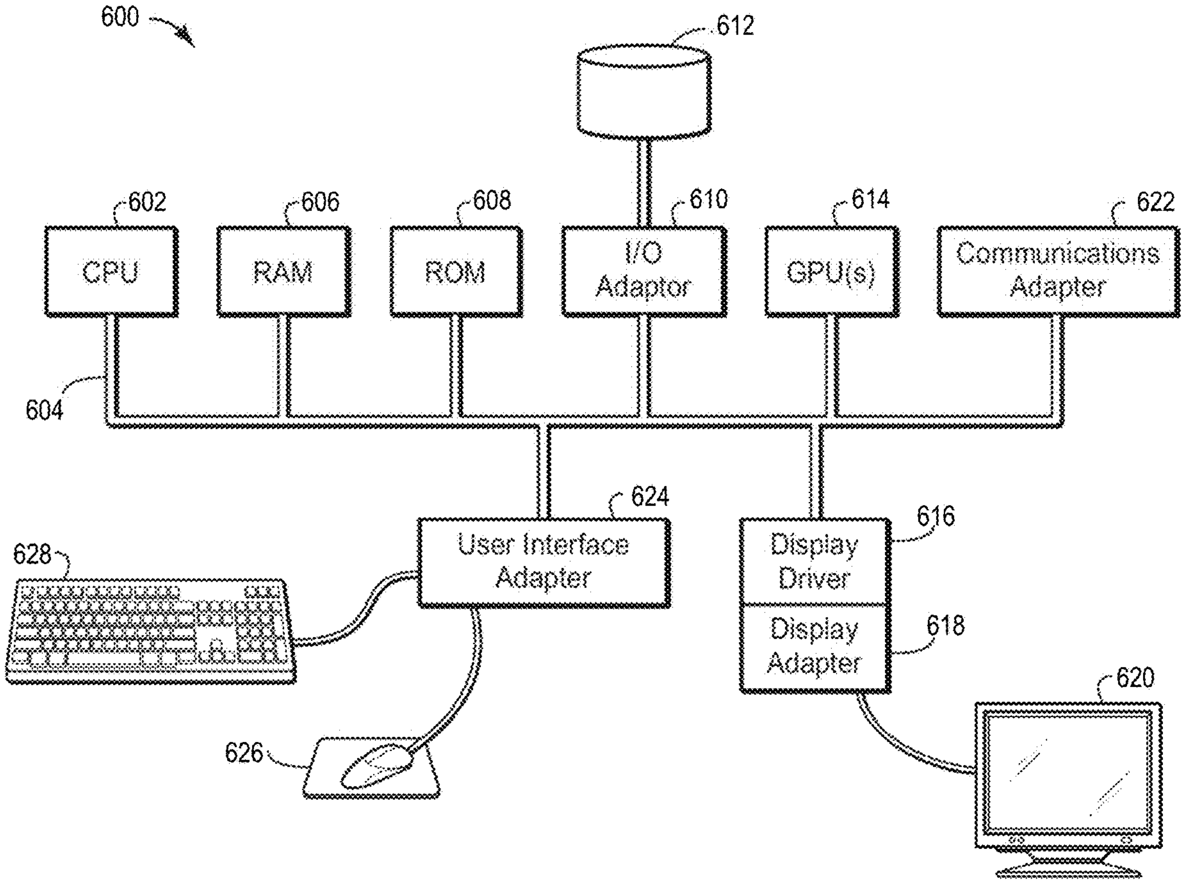
FIG. 6 is a diagram of an exemplary computer system that may be utilized to implement the methods described herein.

FIG. 6 is a diagram of an exemplary computer system 600 that may be utilized to implement methods, including the flow diagrams, described herein. A central processing unit (CPU) 602 is coupled to system bus 604. The CPU 602 may be any general-purpose CPU, although other types of architectures of CPU 602 (or other components of exemplary computer system 600) may be used as long as CPU 602 (and other components of computer system 600) supports the operations as described herein. Those of ordinary skill in the art will appreciate that, while only a single CPU 602 is shown in FIG. 6, additional CPUs may be present. Moreover, the computer system 600 may comprise a networked, multi-processor computer system that may include a hybrid parallel CPU/GPU system. The CPU 602 may execute the various logical instructions according to various teachings disclosed herein. For example, the CPU 602 may execute machine-level instructions for performing processing according to the operational flow described herein.

The computer system 600 may also include computer components such as non-transitory, computer-readable media. Examples of computer-readable media include computer-readable non-transitory storage media, such as a random-access memory (RAM) 606, which may be SRAM, DRAM, SDRAM, or the like. The computer system 600 may also include additional non-transitory, computer-readable storage media such as a read-only memory (ROM) 608, which may be PROM, EPROM, EEPROM, or the like. RAM 606 and ROM 608 hold user and system data and programs, as is known in the art. In this regard, computer-readable media may comprise executable instructions to perform any one, any combination, or all of the blocks in the flow charts in FIGS. 3-5 and 7. The computer system 600 may also include an input/output (I/O) adapter 610, a graphics processing unit (GPU) 614, a communications adapter 622 (e.g., a communication interface), a user interface adapter 624, a display driver 616, and a display adapter 618.

The I/O adapter 610 may connect additional non-transitory, computer-readable media such as storage device(s) 612, including, for example, a hard drive, a compact disc (CD) drive, a floppy disk drive, a tape drive, and the like to computer system 600. The storage device(s) may be used when RAM 606 is insufficient for the memory requirements associated with storing data for operations of the present techniques. The data storage of the computer system 600 may be used for storing information and/or other data used or generated as disclosed herein. For example, storage device(s) 612 may be used to store configuration information or additional plug-ins in accordance with the present techniques. Further, user interface adapter 624 couples user input devices, such as a keyboard 628, a pointing device 626 and/or output devices to the computer system 600. The display adapter 618 is driven by the CPU 602 to control the display on a display device 620 to, for example, present information to the user such as images generated according to methods described herein.

The architecture of computer system 600 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 600 may include various plug-ins and library files. Input data may additionally include configuration information.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting models discussed herein may be downloaded or saved to computer storage.

What is claimed is:

1. A grid-connected electric vehicle charging station system at a customer site, the customer site configured for electrical connection to a utility grid and predetermined for no greater than a predetermined amount of power from the utility grid, the grid-connected electric vehicle charging station system comprising:

at least one DC bus;

AC-DC converter electronics configured for electrical connection at the customer site and for electrical connection to the DC bus;

a plurality of solar panels configured to generate DC power;

DC power storage configured to route the DC power to DC bus or store DC power from the DC bus;

at least first DC-DC converter electronics configured for electrical connection of one or both of the plurality of solar panels or the DC power storage to the DC bus;

a plurality of electric vehicle charging stations, each of the plurality of electric vehicle charging stations including a charging head and configured for electrical connection to the DC bus via at least second DC-DC converter electronics; and at least one controller configured to:

route power from the utility grid to the DC bus to be no greater than the predetermined amount of power from the utility grid as predetermined for the customer site;

route, via control of the at least first DC-DC converter electronics, the DC power from the plurality of solar panels to the DC bus;

route, via control of the at least first DC-DC converter electronics, the DC power to or from the DC power storage; and route, via control of the at least second DC-DC converter electronics, the DC power to respective ones of the plurality of charging stations;

wherein the grid-connected electric vehicle charging station system is configured for installation consisting of a behind-the-meter solution.

2. The grid-connected electric vehicle charging station system of claim 1, wherein the customer site include one or more load panels electrically connected to a distribution network;

wherein the one or more load panels are electrically connected to the AC-DC converter electronics in order to route power from the utility grid to one or both of the DC power storage or at least one of the plurality of electric vehicle charging stations;

wherein the customer site includes one or both of HVAC or lighting; and wherein the one or more load panels are electrically connected to the one or both of HVAC or lighting.

3. The grid-connected electric vehicle charging station system of claim 1, wherein the AC-DC converter electronics is configured to receive no greater than 1,000 V AC from a meter at the customer site both before and after installation of the grid-connected electric vehicle charging station system; and wherein the at least one controller is configured to route the power from the utility grid to the DC bus to be no greater than to be no greater than 1,000 V AC.

4. The grid-connected electric vehicle charging station system of claim 1, wherein the customer site includes a previously-installed meter that is electrically connected to a previously-installed load panel;

wherein the previously-installed load panel is configured for electrical connection to power existing electronics at the customer site; and wherein the grid-connected electric vehicle charging station system is configured for electrical connection to the previously-installed meter and to the previously-installed load panel at the customer site.

5. The grid-connected electric vehicle charging station system of claim 1, wherein the grid-connected electric vehicle charging station system is configured for installation without any change to a distribution network so that prior to the installation and after the installation, the customer site is configured for no greater than the predetermined amount of power from the utility grid.

6. The grid-connected electric vehicle charging station system of claim 1, wherein the customer site includes a newly-installed point of interconnection that is electrically connected to a newly-installed load panel and a newly-installed meter;

wherein the newly-installed meter is configured for electrical installation consisting of no hardware upgrade to a distribution network; and wherein the grid-connected electric vehicle charging station system is configured for electrical connection to the newly-installed meter and to the newly-installed load panel at the customer site.

7. The grid-connected electric vehicle charging station system of claim 1, further comprising:

at least one AC bus configured for electrical connection to at least one load panel; and a second plurality of electric vehicle charging stations, each of the second plurality of electric vehicle charging stations including the charging head and configured for electrical connection to the at least one AC bus via second AC-DC converter electronics.

8. The grid-connected electric vehicle charging station system of claim 1, further comprising:

at least one AC bus configured for electrical connection to at least one load panel via the AC-DC converter electronics and a DC-AC converter; and a second plurality of electric vehicle charging stations, each of the second plurality of electric vehicle charging stations including the charging head and configured for electrical connection to the at least one AC bus via second AC-DC converter electronics; and wherein the at least one controller is further configured to control:

the second AC-DC converter electronics to route the DC power to respective ones of the second plurality of electric vehicle charging stations.

9. The grid-connected electric vehicle charging station system of claim 1, wherein the at least second DC-DC converter electronics, the DC power to respective ones of the plurality of electric vehicle charging stations are modular.

10. The grid-connected electric vehicle charging station system of claim 9, wherein a first charging station of the plurality of electric vehicle charging stations has a single DC-DC converter through which to connect to the at least one DC bus; and wherein a second charging station of the plurality of electric vehicle charging stations has multiple DC-DC converters through which to connect to the at least one DC bus, the multiple DC-DC converters comprise a multiple number of the single DC-DC converter such that power output from the second charging station is the multiple number of the first charging station.

11. The grid-connected electric vehicle charging station system of claim 10, wherein the plurality of solar panels comprise a first set of solar panels having at least one DC-DC bus-to-solar panel converter through which to connect to the at least one DC bus; and wherein the plurality of solar panels comprise a second set of solar panels having the at least one DC-DC bus-to-solar panel converter through which to connect to the at least one DC bus.

12. The grid-connected electric vehicle charging station system of claim 11, wherein the DC power storage comprise a first set of batteries having at least one DC-DC bus-to-battery converter through which to connect to the at least one DC bus; and wherein the DC power storage comprise a second set of batteries having the at least one DC-DC bus-to-battery converter through which to connect to the at least one DC bus.

13. The grid-connected electric vehicle charging station system of claim 1, wherein the at least one controller comprises:

a central controller configured to determine whether or how to route power to one or more electric vehicles responsive to one or more requests for charging of the one or more electric vehicles;

one or more decentralized controllers configured to modify operation based on one or more sensed changes to the DC bus; and wherein the one or more decentralized controllers are associated or included within one or more of the at least second DC-DC converter electronics in order to modify the operation of one or more of the plurality of electric vehicle charging stations.

14. A method for operating a grid-connected electric vehicle charging station system at a customer site, the customer site configured for electrical connection to a utility grid and predetermined for no greater than a predetermined amount of power from the utility grid, the method comprising:

using the grid-connected electric vehicle charging station comprising:

at least one DC bus;

AC-DC converter electronics configured for electrical connection at the customer site and for electrical connection to the DC bus;

a plurality of solar panels configured to generate DC power; DC power storage configured to route the DC power to DC bus or store DC power from the DC bus;

at least first DC-DC converter electronics configured for electrical connection of one or both of the plurality of solar panels or the DC power storage to the DC bus;

a plurality of electric vehicle charging stations, each of the plurality of electric vehicle charging stations including a charging head and configured for electrical connection to the DC bus via at least second DC-DC converter electronics; and at least one controller;

routing power from the utility grid to the DC bus to be no greater than the predetermined amount of power from the utility grid as predetermined for the customer site;

routing, via control of the at least first DC-DC converter electronics, the DC power from the plurality of solar panels to the DC bus;

routing, via control of the at least first DC-DC converter electronics, the DC power to or from the DC power storage; and routing, via control of the at least second DC-DC converter electronics, the DC power to respective ones of the plurality of charging stations;

wherein the grid-connected electric vehicle charging station system is installed as consisting of a behind-the-meter solution.

15. The method of claim 14, wherein the grid-connected electric vehicle charging station system is installed without any change to a distribution network through which the power is routed from the utility grid to the DC bus.

16. The method of claim 14, wherein the at least one controller comprises a central controller and one or more decentralized controllers;

wherein the central controller determines whether or how to route power to one or more electric vehicles responsive to one or more requests for charging of the one or more electric vehicles; and wherein the one or more decentralized controllers modifies operation based on one or more sensed changes to the DC bus.

17. The method of claim 16, where the one or more decentralized controllers are associated or included within one or more of the at least second DC-DC converter electronics and modifies the operation of one or more of the plurality of electric vehicle charging stations.

18. The method of claim 14, wherein, prior to and after using the grid-connected electric vehicle charging station system, the customer site is connected to the utility grid so that no greater than the predetermined amount of power is routed from the utility grid to the customer site;

wherein after the grid-connected electric vehicle charging station system is operational, power is routed from the utility grid to the DC bus; and wherein upgrades to make the grid-connected electric vehicle charging station system operational consist of changes to the customer site and no changes to any distribution network of the utility grid.

19. The method of claim 18, wherein the grid-connected electric vehicle charging station system is electrically connected to at least one new load panel of a new meter at the customer site; and wherein upgrades to make the grid-connected electric vehicle charging station system operational consist of changes behind the at least one new load panel at the customer site and no changes to any distribution network of the utility grid.

20. The method of claim 18, wherein the grid-connected electric vehicle charging station system is electrically connected to at least one existing load panel of an existing meter at the customer site; and wherein upgrades to make the grid-connected electric vehicle charging station system operational consist of changes behind the at least one existing load panel at the customer site and no changes to the utility grid.

21. The method of claim 18, wherein the grid-connected electric vehicle charging station system is electrically connected to at least one new load panel of an existing meter at the customer site; and wherein upgrades to make the grid-connected electric vehicle charging station system operational consist of changes behind the at least one new load panel at the customer site and no changes to the utility grid.

* * * * *